(12) United States Patent
Takemori et al.

(10) Patent No.: US 11,366,885 B2
(45) Date of Patent: Jun. 21, 2022

(54) VEHICLE SECURITY SYSTEM AND VEHICLE SECURITY METHOD

(71) Applicant: KDDI CORPORATION, Tokyo (JP)

(72) Inventors: Keisuke Takemori, Tokyo (JP);
Seiichirou Mizoguchi, Tokyo (JP);
Akinori Totsuka, Tokyo (JP); Hiroshi Ishizuka, Tokyo (JP)

(73) Assignee: KDDI CORPORATION, Tokyo (JP)

(*) Notice: Subject to any disclaimer, the term of this patent is extended or adjusted under 35 U.S.C. 154(b) by 173 days.

(21) Appl. No.: 16/629,452

(22) PCT Filed: Jun. 21, 2018

(86) PCT No.: PCT/JP2018/023624
§ 371 (c)(1),
(2) Date: Jan. 8, 2020

(87) PCT Pub. No.: WO2019/035275
PCT Pub. Date: Feb. 21, 2019

(65) Prior Publication Data
US 2020/0201959 A1    Jun. 25, 2020

(30) Foreign Application Priority Data

Aug. 14, 2017 (JP) .............................. JP2017-156488

(51) Int. Cl.
*G06F 21/00* (2013.01)
*G06F 21/31* (2013.01)
(Continued)

(52) U.S. Cl.
CPC .............. *G06F 21/31* (2013.01); *G06F 21/44* (2013.01); *H04L 9/0863* (2013.01); *H04L 9/3213* (2013.01)

(58) Field of Classification Search
CPC ....... G06F 21/31; G06F 21/44; H04L 9/0863; H04L 9/3213; H04L 2209/84;
(Continued)

(56) References Cited

U.S. PATENT DOCUMENTS 7,314,169 B1 * 1/2008 Jasper ................... G06F 21/445
235/382
8,443,426 B2 * 5/2013 Mattsson ............... G06F 16/217
726/6

(Continued)

FOREIGN PATENT DOCUMENTS

CN    106534071       3/2017
CN    106534071 A  *  3/2017  ............ B60R 25/01
(Continued)

OTHER PUBLICATIONS

Jun. 13, 2021 Indian Office Action in corresponding Indian Application No. 202017001428 and English translation.
(Continued)

*Primary Examiner* — John B King
(74) *Attorney, Agent, or Firm* — Greenblum & Bernstein, P.L.C.

(57) ABSTRACT

A vehicle security system includes a terminal device, a server device, and a vehicle. The terminal device includes a token acquisition unit and a terminal communication unit configured to transmit the token, terminal identification information, and vehicle identification information to the server device. The server device includes a server communication unit, a server determination unit configured to determine that authentication has succeeded, and a server storage unit configured to store the terminal identification information and the vehicle identification information received from an authenticated terminal device in association. The server communication unit transmits the token and the terminal identification information to the vehicle of the (Continued)

vehicle identification information. The vehicle includes a vehicle communication unit, a vehicle determination unit configured to determine that authentication has succeeded, and a vehicle storage unit configured to store the received terminal identification information in association with the token of authentication success.

12 Claims, 13 Drawing Sheets

(51) Int. Cl.
  *G06F 21/44* (2013.01)
  *H04L 9/08* (2006.01)
  *H04L 9/32* (2006.01)
(58) Field of Classification Search
  CPC ............ H04L 9/3226; H04L 63/0853; H04L 63/0876; H04W 12/069
  See application file for complete search history.

(56) References Cited

U.S. PATENT DOCUMENTS

| | | | | |
|---|---|---|---|---|
| 8,984,282 B1* | 3/2015 | Kragh | .................... | H04L 9/321 713/186 |
| 9,204,302 B1* | 12/2015 | Shaw | .................... | H04M 3/533 |
| 9,262,460 B2* | 2/2016 | Hanke | .................. | H04W 12/35 |
| 9,274,647 B2* | 3/2016 | Fadell | .................. | H04L 9/3231 |
| 9,633,373 B2* | 4/2017 | Jung | .................... | H04W 12/06 |
| 9,674,194 B1* | 6/2017 | McClintock | ......... | H04L 63/123 |
| 9,760,697 B1* | 9/2017 | Walker | ................. | G06F 21/602 |
| 10,296,355 B2* | 5/2019 | Keyser | ................ | H04L 9/3249 |
| 10,855,664 B1* | 12/2020 | Ziraknejad | ........... | H04W 4/021 |
| 2003/0005326 A1* | 1/2003 | Flemming | ............. | G07C 9/37 726/4 |
| 2004/0006631 A1* | 1/2004 | Nonaka | .................... | G07C 9/27 709/229 |
| 2005/0154923 A1* | 7/2005 | Lok | .................... | H04L 63/0807 726/19 |
| 2005/0254514 A1* | 11/2005 | Lynn | .................. | H04L 63/0846 370/450 |
| 2006/0085652 A1* | 4/2006 | Zimmer | .............. | G06F 13/4068 713/193 |
| 2007/0143835 A1* | 6/2007 | Cameron | ................ | G06F 21/33 726/9 |
| 2007/0245369 A1* | 10/2007 | Thompson | .............. | H04L 63/10 725/30 |
| 2008/0075290 A1* | 3/2008 | Nishiguchi | ............ | G06F 21/10 380/278 |
| 2008/0281485 A1* | 11/2008 | Plante | ...................... | H04N 5/77 701/33.4 |
| 2010/0296387 A1* | 11/2010 | Jain | ....................... | G06F 21/606 701/1 |
| 2011/0083161 A1* | 4/2011 | Ishida | ................... | G06F 21/572 726/2 |
| 2011/0144844 A1 | 6/2011 | Ishibashi | | |
| 2011/0276803 A1* | 11/2011 | Bender | ................. | H04L 9/3263 713/175 |
| 2012/0254960 A1 | 10/2012 | Lortz et al. | | |
| 2012/0265988 A1* | 10/2012 | Ehrensvard | ......... | H04L 63/0435 713/165 |
| 2013/0066786 A1* | 3/2013 | Joyce | ..................... | G06Q 20/12 705/64 |
| 2013/0145447 A1* | 6/2013 | Maron | .................... | G06F 21/31 726/6 |
| 2013/0160086 A1* | 6/2013 | Katar | ...................... | H04L 63/08 726/4 |
| 2013/0208893 A1* | 8/2013 | Shablygin | ............. | H04L 9/3234 380/277 |
| 2015/0024688 A1 | 1/2015 | Hrabak et al. | | |
| 2015/0052591 A1* | 2/2015 | Miura | .................. | A01B 79/005 726/4 |
| 2015/0058950 A1* | 2/2015 | Miu | ..................... | G06Q 20/384 726/7 |
| 2015/0195364 A1* | 7/2015 | Petersen | ................ | H04W 12/04 713/168 |
| 2015/0244712 A1* | 8/2015 | Iwanski | ............... | H04L 63/0823 713/153 |
| 2015/0339334 A1 | 11/2015 | Hanke | | |
| 2016/0034305 A1* | 2/2016 | Shear | ......................... | G06F 9/50 707/722 |
| 2016/0148450 A1* | 5/2016 | Ohshima | ............ | B62D 15/0285 340/5.61 |
| 2016/0321290 A1* | 11/2016 | Luthra | ................... | G06F 16/113 |
| 2016/0364197 A1* | 12/2016 | Cho | ...................... | G08G 1/0175 |
| 2016/0371481 A1* | 12/2016 | Miyake | ................. | H04L 9/3228 |
| 2017/0006009 A1* | 1/2017 | Hessler | ................ | G06Q 20/384 |
| 2017/0006060 A1* | 1/2017 | Venkataramani | ... | H04L 63/1466 |
| 2017/0104588 A1* | 4/2017 | Camenisch | ........... | H04L 9/0891 |
| 2017/0124562 A1* | 5/2017 | Hessler | ................ | G06Q 20/321 |
| 2017/0134885 A1 | 5/2017 | Lortz et al. | | |
| 2017/0195320 A1* | 7/2017 | Yoo | ............... | H04L 9/14 |
| 2017/0201385 A1* | 7/2017 | Kravitz | .................... | H04L 9/006 |
| 2017/0279620 A1* | 9/2017 | Kravitz | ............... | H04L 63/0876 |
| 2017/0318011 A1* | 11/2017 | Yoo | ........................ | H04L 9/3228 |
| 2017/0330402 A1* | 11/2017 | Menard | .............. | G07C 9/00857 |
| 2017/0372533 A1* | 12/2017 | Merg | ........................ | G07C 5/06 |
| 2018/0006819 A1* | 1/2018 | Watanabe | ........... | H04L 63/0428 |
| 2018/0013738 A1* | 1/2018 | Yoo | .................. | H04L 63/0853 |
| 2018/0076958 A1* | 3/2018 | Nari | ...................... | H04L 9/0891 |
| 2018/0167789 A1* | 6/2018 | Tsuchida | ............. | H04L 67/2847 |
| 2018/0227120 A1* | 8/2018 | Takemori | .............. | H04L 9/0894 |
| 2018/0292513 A1* | 10/2018 | Bidner | ..................... | G01S 17/42 |
| 2018/0308295 A1* | 10/2018 | Kwak | ..................... | G06F 9/453 |
| 2018/0322721 A1* | 11/2018 | Hu | ...................... | G07C 9/00571 |
| 2018/0343562 A1* | 11/2018 | Nalukurthy | ........... | H04L 63/062 |
| 2019/0028267 A1* | 1/2019 | Takemori | .............. | H04L 9/3242 |
| 2019/0039567 A1* | 2/2019 | Froitzheim | ............. | B60R 25/24 |
| 2019/0047513 A1* | 2/2019 | Fuke | ................ | G07C 9/00563 |
| 2019/0107401 A1* | 4/2019 | Schmidt | ..................... | B60S 1/50 |
| 2019/0110195 A1* | 4/2019 | Ito | ........................ | H04W 12/106 |
| 2019/0155998 A1* | 5/2019 | Yamaguchi | ........... | G06F 21/105 |
| 2019/0238325 A1* | 8/2019 | Takemori | ................ | G09C 1/00 |
| 2019/0245691 A1* | 8/2019 | Takemori | .............. | H04L 9/3234 |
| 2020/0108700 A1* | 4/2020 | Flanigan | ............ | G05B 19/0423 |
| 2020/0259655 A1* | 8/2020 | Woo | ........................ | H04L 9/3213 |

FOREIGN PATENT DOCUMENTS

| | | | |
|---|---|---|---|
| JP | 2007-251557 A | | 9/2007 |
| JP | 2007251557 A | * | 9/2007 |
| JP | 5729337 | | 6/2015 |
| JP | 2016-152438 A | | 8/2016 |
| JP | 2016152438 A | * | 8/2016 |
| WO | WO-2010124707 A1 | * | 11/2010 ............ G06F 21/31 |

OTHER PUBLICATIONS

Takemori, "In-Vehicle Network Security Using Secure Elements-", IEICE, IEICE Technical Report, vol. 114, No. 508, Mar. 2015, pp. 73-78; see English Abstract and p. 1 of the specification citing this document.

International Search Report issued in International Patent Application No. PCT/JP2018/023624, dated Sep. 11, 2018; see attached English translation thereof.

Apr. 13, 2021 Extemded European Search Report in corresponding European Application No. 18845857.4.

* cited by examiner

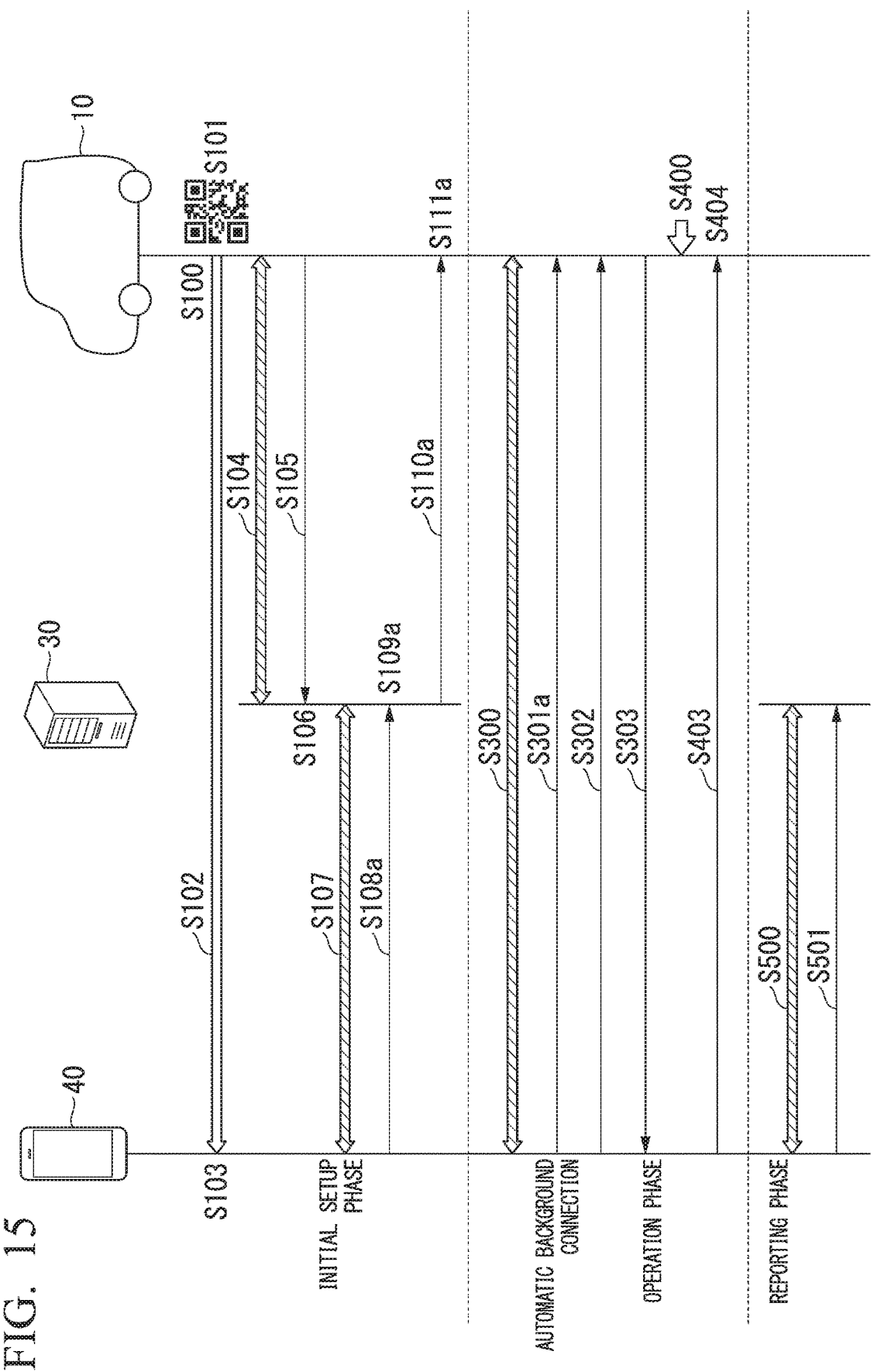

VEHICLE SECURITY SYSTEM AND VEHICLE SECURITY METHOD

TECHNICAL FIELD

The present invention relates a vehicle security system and a vehicle security method.

Priority is claimed on Japanese Patent Application No. 2017-156488, filed Aug. 14, 2017, the content of which is incorporated herein by reference.

BACKGROUND ART

Conventionally, a car has an electronic control unit (ECU), and implements a function such as engine control through the ECU. The ECU is a type of computer and implements a desired function through a computer program. For example, security technology for an in-vehicle control system configured by connecting a plurality of ECUs to a controller area network (CAN) is described in Non-Patent Literature 1.

CITATION LIST

Non-Patent Literature

[Non-Patent Literature 1]
Keisuke TAKEMORI, "In-vehicle Network Security Using Secure Elements: Discussion of Security Technologies", Institute of Electronics, Information and Communication Engineers, Technical Report, vol. 114, no. 508, pp. 73-78, March 2015

SUMMARY OF INVENTION

Problem to be Solved by the Invention

One problem to be solved is to improve security when an operation, for example, such as starting and stopping of an air conditioner of a car, or unlocking of a door of the car, or monitoring of a state of the car, or the like, is performed by means of communication from a terminal device such as a smartphone.

The present invention has been made in consideration of such circumstances and an objective of the present invention is to improve security when a vehicle such as a car is accessed by means of communication from a terminal device such as a smartphone.

Means for Solving the Problem (1) According to an aspect of the present invention, a vehicle security system includes: a terminal device; a server device; and a vehicle, wherein the terminal device includes a token acquisition unit configured to acquire a token of the vehicle; and a terminal communication unit configured to transmit the token acquired by the token acquisition unit, terminal identification information of the terminal device, and vehicle identification information of the vehicle to the server device, wherein the server device includes a server communication unit configured to receive the token, the terminal identification information, and the vehicle identification information from the terminal device; a server determination unit configured to determine that authentication has succeeded when the token of the vehicle is the same as the token received from the terminal device by the server communication unit; and a server storage unit configured to store the terminal identification information and the vehicle identification information received from an authenticated terminal device for which a result of determining the token in the server determination unit is authentication success in association, wherein the server communication unit transmits the token and the terminal identification information received from the authenticated terminal device to the vehicle of the vehicle identification information received from the authenticated terminal device, and wherein the vehicle includes a vehicle communication unit configured to receive the token and the terminal identification information from the server device; a vehicle determination unit configured to determine that authentication has succeeded when the token of the vehicle is the same as the token received from the server device by the vehicle communication unit; and a vehicle storage unit configured to store the terminal identification information received from the server device in association with the token for which a result of determining the token in the vehicle determination unit is authentication success.

(2) According to an aspect of the present invention, in the vehicle security system of the above-described (1), the vehicle includes a vehicle token issuance unit configured to issue the token of the vehicle and supply the token to the server device.

(3) According to an aspect of the present invention, in the vehicle security system of the above-described (1), the server device includes a server token issuance unit configured to issue the token of the vehicle and supply the token to the vehicle.

(4) According to an aspect of the present invention, in the vehicle security system of any one of the above-described (1) to (3), the vehicle includes a token provision unit configured to provide the token of the vehicle within the vehicle.

(5) According to an aspect of the present invention, in the vehicle security system of any one of the above-described (1) to (4), the terminal communication unit transmits a password to the server device in addition to the token acquired by the token acquisition unit, the terminal identification information of the terminal device, and the vehicle identification information of the vehicle, the server communication unit receives the password in addition to the token, the terminal identification information, and the vehicle identification information from the terminal device, the server storage unit associates and stores the password in addition to the terminal identification information and the vehicle identification information received from the authenticated terminal device, the server communication unit transmits the password to the vehicle of the vehicle identification information received from the authenticated terminal device in addition to the token and the terminal identification information received from the authenticated terminal device, the vehicle communication unit receives the password in addition to the token and the terminal identification information from the server device, and the vehicle storage unit associates and stores the terminal identification information and the password received from the server device in association with the token for which the result of determining the token in the vehicle determination unit is authentication success.

(6) According to an aspect of the present invention, in the vehicle security system of any one of the above-described (1) to (4), the terminal communication unit transmits a message including the terminal identification information of the terminal device and the token acquired by the token acquisition unit to the server device, the server communication unit receives the message from the terminal device, the server determination unit determines that authentication has succeeded when the token of the vehicle is the same as the token included in the message received from the terminal device by the server communication unit, the server communication unit transmits vehicle control information received from the terminal device of a transmission source of the message to the vehicle of the vehicle identification information stored in the server storage unit in association with the terminal identification information included in the message when a result of determining the message in the server determination unit is authentication success, and the server communication unit does not transmit the vehicle control information received from the terminal device of the transmission source of the message to the vehicle when the result of determining the message in the server determination unit is authentication failure.

(7) According to an aspect of the present invention, in the vehicle security system of the above-described (5), the terminal communication unit transmits a message including the terminal identification information of the terminal device and the password to the server device, the server communication unit receives the message from the terminal device, the server determination unit determines that authentication has succeeded when a password stored in the server storage unit in association with the terminal identification information included in the message received from the terminal device by the server communication unit is the same as the password included in the message, the server communication unit transmits vehicle control information received from the terminal device of a transmission source of the message to the vehicle of the vehicle identification information stored in the server storage unit in association with the terminal identification information included in the message when a result of determining the message in the server determination unit is authentication success, and the server communication unit does not transmit the vehicle control information received from the terminal device of the transmission source of the message to the vehicle when the result of determining the message in the server determination unit is authentication failure.

(8) According to an aspect of the present invention, in the vehicle security system of any one of the above-described (1) to (4), the terminal communication unit transmits a message including the terminal identification information of the terminal device and the token acquired by the token acquisition unit to the vehicle, the vehicle communication unit receives the message from the terminal device, the vehicle determination unit determines that authentication has succeeded when the token of the vehicle is the same as the token of the message received from the terminal device by the vehicle communication unit, the vehicle executes process based on vehicle control information received from the terminal device of a transmission source of the message when a result of determining the message in the vehicle determination unit is authentication success, and the vehicle does not execute process based on the vehicle control information received from the terminal device of the transmission source of the message when the result of determining the message in the vehicle determination unit is authentication failure.

(9) According to an aspect of the present invention, in the vehicle security system of the above-described (5), the terminal communication unit transmits a message including the terminal identification information of the terminal device and the password to the vehicle, the vehicle communication unit receives the message from the terminal device, the vehicle determination unit determines that authentication has succeeded when the password stored in the vehicle storage unit in association with the terminal identification information included in the message received from the terminal device by the vehicle communication unit is the same as the password included in the message, the vehicle executes process based on vehicle control information received from the terminal device of a transmission source of the message when a result of determining the message in the vehicle determination unit is authentication success, and the vehicle does not execute process based on the vehicle control information received from the terminal device of the transmission source of the message when the result of determining the message in the vehicle determination unit is authentication failure.

(10) According to an aspect of the present invention, in the vehicle security system of any one of the above-described (1) to (9), the vehicle communication unit executes a connection of communication to the terminal device of the terminal identification information stored in the vehicle storage unit after an ignition switch of the vehicle is turned on, and the vehicle determination unit executes a process of setting the terminal identification information as invalid information in accordance with an absence of authentication of the terminal device of the terminal identification information stored in the vehicle storage unit after the ignition switch of the vehicle is turned on.

(11) According to an aspect of the present invention, in the vehicle security system of any one of the above-described (1) to (10), the terminal device includes a terminal position information acquisition unit configured to acquire terminal position information indicating a position of the terminal device, the vehicle includes a vehicle position information acquisition unit configured to acquire vehicle position information indicating a position of the vehicle, the terminal communication unit transmits the terminal position information of the terminal device to the vehicle, the vehicle communication unit receives the terminal position information from the terminal device, and the vehicle determination unit causes the vehicle storage unit to hold the terminal identification information as valid information when a first position indicated by the terminal position information received from the terminal device of the terminal identification information stored the vehicle storage unit and a second position indicated by the vehicle position information acquired by the vehicle position information acquisition unit are present within a prescribed range after an ignition switch of the vehicle is turned on.

(12) According to an aspect of the present invention, a vehicle security method includes: acquiring, by a terminal device, a token of a vehicle; transmitting, by the terminal device, the acquired token, terminal identification information of the terminal device, and vehicle identification information of the vehicle to a server device; receiving, by the server device, the token, the terminal identification information, and the vehicle identification information from the terminal device; determining, by the server device, that authentication has succeeded when the token of the vehicle is the same as the token received from the terminal device; storing, by the server device, the terminal identification information and the vehicle identification information received from an authenticated terminal device for which a result of determining the token is authentication success in association in a server storage unit; transmitting, by the server device, the token and the terminal identification information received from the authenticated terminal device to the vehicle of the vehicle identification information received from the authenticated terminal device; receiving, by the vehicle, the token and the terminal identification information from the server device; determining, by the vehicle, that authentication has succeeded when the token of the vehicle is the same as the token received from the server device; and storing, by the vehicle, the terminal identification information received from the server device in association with the token for which a result of determining the token is authentication success in a vehicle storage unit.

Advantageous Effects of Invention

According to the present invention, it is possible to improve security when a vehicle such as a car is accessed by means of communication from a terminal device such as a smartphone.

BRIEF DESCRIPTION OF DRAWINGS

FIG. 15 is a sequence chart showing Example 10 of a vehicle security method according to an embodiment.

DESCRIPTION OF EMBODIMENTS

Hereinafter, embodiments of the present invention will be described with reference to the drawings. Also, in the following embodiments, an example in which a car is used as a vehicle will be described.

Figure 1:
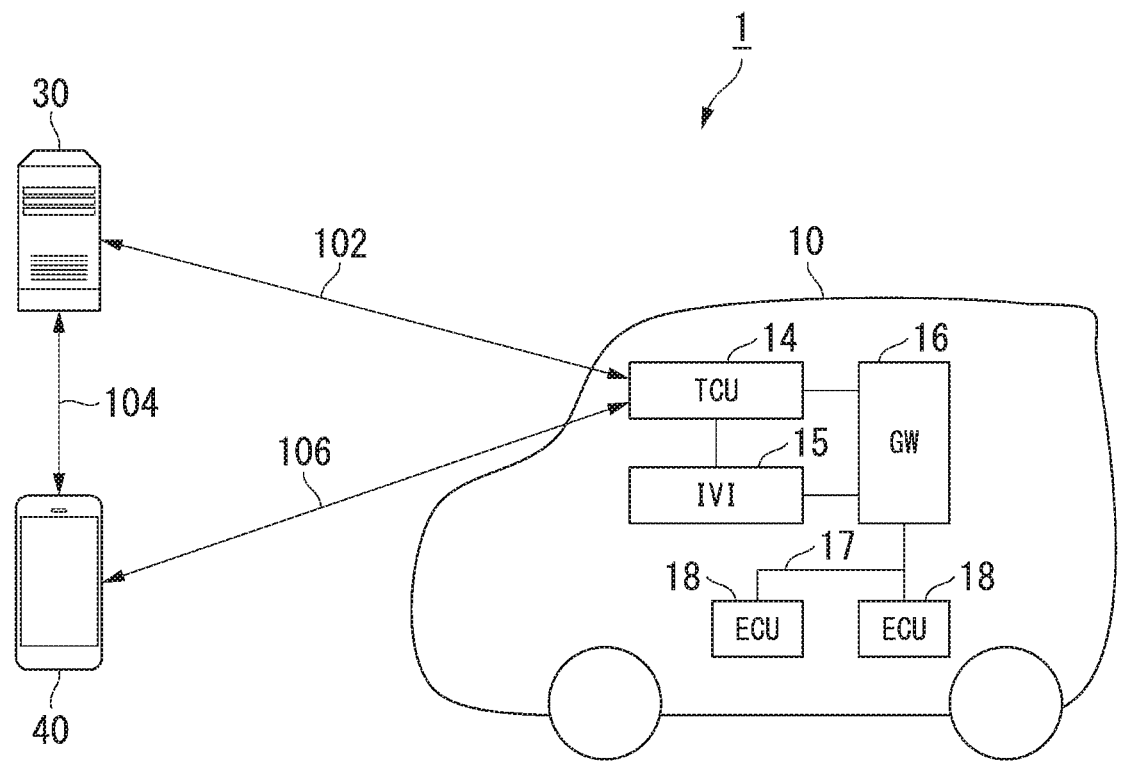
FIG. 1 is a schematic configuration diagram of a vehicle security system according to an embodiment.

FIG. 1 is a schematic configuration diagram of a vehicle security system 1 according to the present embodiment. In FIG. 1, a vehicle security system 1 includes a car 10, a server device 30, and a terminal device 40. The car 10 includes a telecommunication unit (TCU) 14, an in-vehicle infotainment (IVI) device 15, a gateway (GW) device 16, a communication network 17, and a plurality of electronic control devices (ECUs) 18.

The ECU 18 is an in-vehicle computer provided in the car 10. The ECU 18 has a control function such as engine control of the car 10. Examples of the ECU 18 include an ECU having an engine control function, an ECU having a steering-wheel control function, an ECU having a brake control function, and the like. The gateway device 16 has a function of data security (security) applied to the ECU 18 installed in the car 10. Also, any ECU installed in the car 10 may function as the gateway device 16.

The gateway device 16 and the plurality of ECUs 18 are connected to a communication network (hereinafter referred to as an in-vehicle network) 17 provided in the car 10. The in-vehicle network 17 may be, for example, a controller area network (CAN). The CAN is known as one of communication networks installed in vehicles. The gateway device 16 exchanges data with each ECU 18 via the in-vehicle network 17. The ECU 18 exchanges data with other ECUs 18 via the in-vehicle network 17.

Also, as a communication network installed in a vehicle, a communication network other than the CAN is provided in the car 10. The exchange of data between the gateway device 16 and the ECU 18 and between the ECUs 18 may be performed via the communication network other than the CAN. For example, the car 10 may include a local interconnect network (LIN). Also, the CAN and the LIN may be provided in the car 10. Also, the ECU 18 connected to the LIN may be provided in the car 10. Also, the gateway device 16 may be connected to the CAN and the LIN. Also, the gateway device 16 may exchange data with the ECU 18 connected to the CAN via the CAN and exchange data with the ECU 18 connected to the LIN via the LIN. Also, the ECUs 18 may exchange data with each other via the LIN.

An in-vehicle computer system of the car 10 is configured by connecting the gateway device 16 and the plurality of ECUs 18 to the in-vehicle network 17. The gateway device 16 monitors communication between inside and outside of the in-vehicle computer system of the car 10. The ECU 18 communicates with devices outside the in-vehicle computer system via the gateway device 16.

Also, for the configuration of the in-vehicle network 17, the in-vehicle network 17 may include a plurality of buses (communication lines) and the plurality of buses may be connected to the gateway device 16. In this case, one or more ECUs 18 are connected to one bus.

The TCU 14 is a communication device. The TCU 14 communicates with devices outside the car 10. The TCU 14 may perform wireless communication or may perform wired communication. As an example according to the present embodiment, the TCU 14 performs wireless communication using a wireless communication network. The TCU 14 communicates with the server device 30 via the communication path 102. The communication path 102 is a communication path including a wireless communication path of a wireless communication network used by the TCU 14. The communication path 102 may be configured from a wireless communication path and a wired communication path.

Also, as an example according to the present embodiment, the TCU 14 performs near-field wireless communication. The TCU 14 communicates with the terminal device 40 via the communication path 106. The communication path 106 may be, for example, a wireless communication path of near-field wireless communication or the like. The communication path 106 may be, for example, a wireless communication path of a wireless LAN such as "Wi-Fi (registered trademark)" or may be a wireless communication path of "Bluetooth (registered trademark)".

The server device 30 communicates with the TCU 14 of the car 10 via the communication path 102. The server device 30 communicates with devices installed in the car 10 via the TCU 14 of the car 10. The terminal device 40 communicates with the TCU 14 of the car 10 via the communication path 106. The terminal device 40 communicates with a device installed in the car 10 via the TCU 14 of the car 10.

The TCU 14 is connected to the IVI device 15 and the gateway device 16. The IVI device 15 is connected to the TCU 14 and the gateway device 16. The IVI device 15 communicates with devices outside the car 10 via the TCU 14. The IVI device 15 may communicate with the server device 30 via the TCU 14 or may communicate with the terminal device 40 via the TCU 14. The IVI device 15 communicates with the ECU 18 via the gateway device 16.

The server device 30 communicates with the terminal device 40 via a communication path 104. The communication path 104 may be a wireless communication path or a wired communication path or may include a wireless communication path and a wired communication path. For example, the server device 30 and the terminal device 40 may be connected by a communication cable. Alternatively, the server device 30 and the terminal device 40 may be configured to perform communication via a wired or wireless communication network. For example, the server device 30 and the terminal device 40 may be connected by a wired or wireless local area network (LAN).

Figure 2:
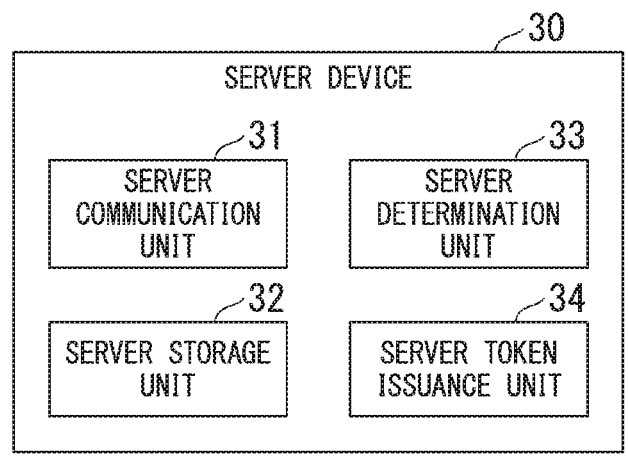
FIG. 2 is a schematic configuration diagram of a server device according to an embodiment.

FIG. 2 is a schematic configuration diagram of the server device 30 according to the present embodiment. In FIG. 2, the server device 30 includes a server communication unit 31, a server storage unit 32, a server determination unit 33, and a server token issuance unit 34. The server communication unit 31 communicates with the car 10 via the communication path 102. The server communication unit 31 communicates with the terminal device 40 via the communication path 104. The server storage unit 32 stores data. The server determination unit 33 determines a token. The token is information (authentication identification information) used to authenticate the terminal device 40. The token is information including token identification information for identifying the token. The server token issuance unit 34 issues a token.

The function of the server device 30 is implemented by a central processing unit (CPU) provided in the server device 30 executing a computer program. Also, the server device 30 may be configured using a general-purpose computer device or may be configured as a dedicated hardware device.

Figure 3:
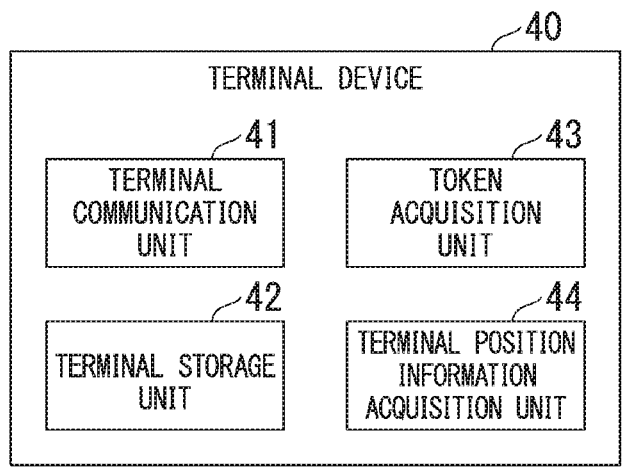
FIG. 3 is a schematic configuration diagram of a terminal device according to an embodiment.

FIG. 3 is a schematic configuration diagram of the terminal device 40 according to the present embodiment. In FIG. 3, the terminal device 40 includes a terminal communication unit 41, a terminal storage unit 42, a token acquisition unit 43, and a terminal position information acquisition unit 44. The terminal communication unit 41 communicates with the server device 30 via the communication path 104. The terminal communication unit 41 communicates with the car 10 via the communication path 106. The terminal storage unit 42 stores data.

The token acquisition unit 43 acquires the token. The token acquisition unit 43 includes a data input means corresponding to a type of data including the token. For example, when the data including the token is text data, the token acquisition unit 43 includes a text data input means. For example, when the data including the token is image data, the token acquisition unit 43 includes an input means for the image data.

The terminal position information acquisition unit 44 acquires terminal position information indicating a position of the terminal device 40. For example, a global positioning system (GPS) can be applied as the terminal position information acquisition unit 44.

The function of the terminal device 40 is implemented by a CPU provided in the terminal device 40 executing a computer program. Also, the terminal device 40 may be configured using a general-purpose computer device or may be configured as a dedicated hardware device. Also, a portable communication terminal device such as a smartphone, a tablet computer device (a tablet PC), or the like may be used as the terminal device 40.

Figure 4:
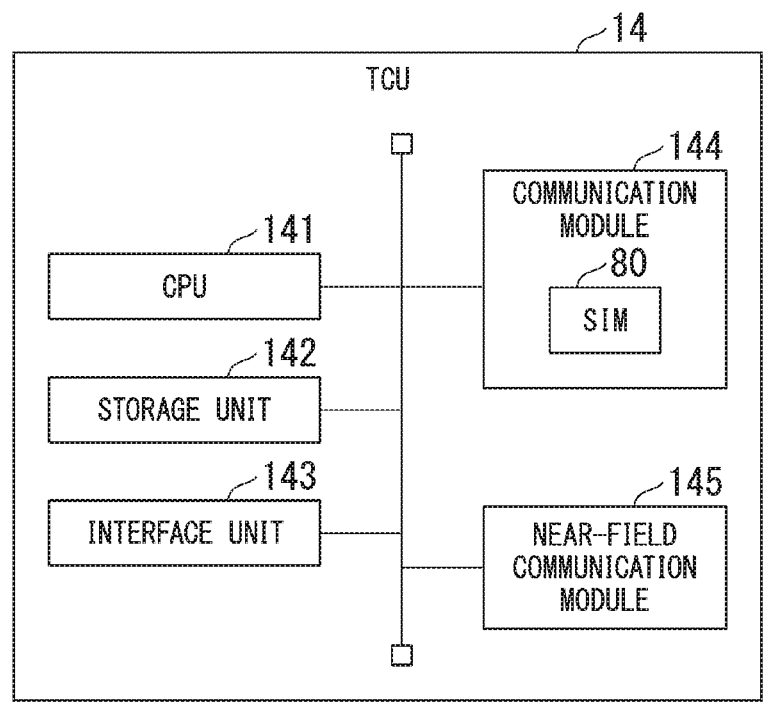
FIG. 4 is a block diagram showing an example of a hardware configuration of a TCU according to an embodiment.

FIG. 4 is a block diagram showing an example of a hardware configuration of the TCU 14 according to the present embodiment.

In FIG. 4, the TCU 14 includes a CPU 141, a storage unit 142, an interface unit 143, a communication module 144, and a near-field communication module 145. These units are configured to exchange data. The communication module 144 includes a subscriber identity module (SIM) 80.

The CPU 141 controls the TCU 14. This control function is implemented by the CPU 141 executing a computer program. The storage unit 142 stores a computer program to be executed by the CPU 141 and various types of data. The storage unit 142 stores a computer program for implementing various types of functions of the TCU 14. Various types of functions of the TCU 14 are implemented by the CPU 141 executing the computer program.

The interface unit 143 exchanges data with a device outside the TCU 14. The interface unit 143 includes an interface for exchanging data with the IVI device 15 and an interface for exchanging data with the gateway device 16.

The communication module 144 performs wireless communication using a wireless communication network. The communication module 144 includes the SIM 80. The SIM 80 is a SIM to which information using the wireless communication network is written. The communication module 144 can be connected to the wireless communication network using the SIM 80 to perform wireless communication. As an example according to the present embodiment, the communication path 102 is a communication path including a wireless communication path of a wireless communication network to which the communication module 144 is connected by the SIM 80.

Also, as the SIM 80, an embedded subscriber identity module (eSIM) may be used. The SIM and the eSIM are examples of a secure element (SE). The SIM and the eSIM are tamper-resistant.

The near-field communication module 145 performs near-field wireless communication. For example, "Wi-Fi (registered trademark)", "Bluetooth (registered trademark)", or the like can be applied as a near-field wireless communication scheme. As an example according to the present embodiment, the communication path 106 is a wireless communication path established by the near-field communication module 145 with the terminal device 40.

Figure 5:
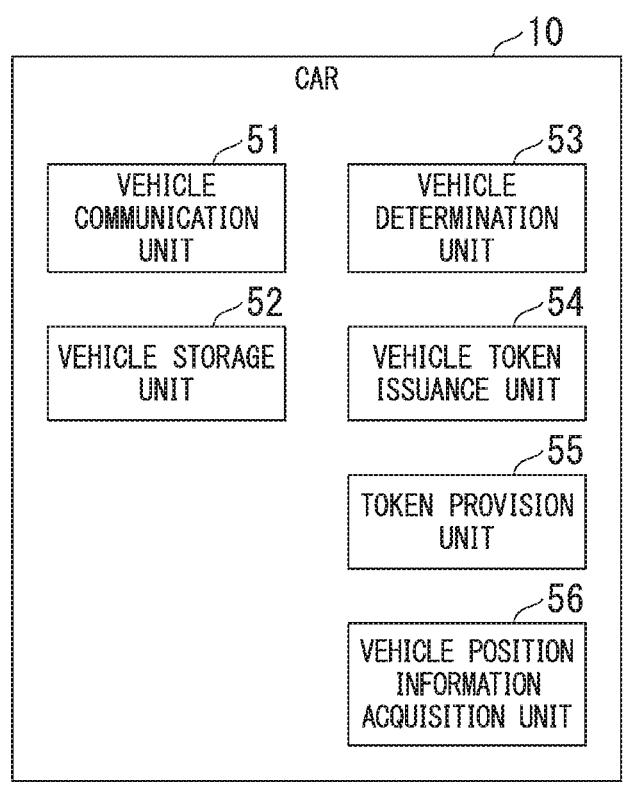
FIG. 5 is a diagram showing an example of a functional configuration of a vehicle according to an embodiment.

FIG. 5 is a diagram showing an example of a functional configuration of the car 10 according to the present embodiment. In FIG. 5, the car 10 includes a vehicle communication unit 51, a vehicle storage unit 52, a vehicle determination unit 53, a vehicle token issuance unit 54, a token provision unit 55, and a vehicle position information acquisition unit 56.

The vehicle communication unit 51 communicates with the server device 30 via the communication path 102. The vehicle communication unit 51 communicates with the terminal device 40 via the communication path 106. The vehicle storage unit 52 stores data. The vehicle determination unit 53 determines a token. The vehicle token issuance unit 54 issues the token. The token provision unit 55 provides the issued token of the car 10 inside the car 10. The vehicle position information acquisition unit 56 acquires vehicle position information indicating the position of own car 10. For example, a GPS can be applied as the vehicle position information acquisition unit 56.

As an example according to the present embodiment, the functions of the respective units of the car 10 shown in FIG. 5 are implemented by the CPU 141 of the TCU 14 executing a computer program. As an example according to the present embodiment, the function of the vehicle communication unit 51 is implemented by the CPU 141 controlling the communication module 144 and the near-field communication module 145. As an example according to the present embodiment, the function of the vehicle storage unit 52 is implemented by the CPU 141 controlling the storage unit 142. As an example according to the present embodiment, the function of the vehicle determination unit 53 is implemented by the CPU 141 executing a computer program for implementing the function of the vehicle determination unit 53. As an example according to the present embodiment, the function of the vehicle token issuance unit 54 is implemented by the CPU 141 executing a computer program for implementing the function of the vehicle token issuance unit 54. As an example according to the present embodiment, the function of the token provision unit 55 is implemented by the CPU 141 executing a computer program for implementing the function of the token provision unit 55.

Also, although the TCU 14 implements the functions of each part of the car 10 shown in FIG. 5 in the present embodiment, an in-vehicle device other than the TCU 14 installed in the car 10 may be configured to implement all or some of the functions of the car 10 shown in FIG. 5. For example, the IVI device 15 or the gateway device 16 may be configured to implement all or some of the functions of the car 10 shown in FIG. 5. For example, the TCU 14 may be configured to implement the function of the vehicle communication unit 51 and the IVI device 15 or the gateway device 16 may be configured to implement the functions of the units 52 to 55 other than the vehicle communication unit 51.

Example 1 of Vehicle Security Method

Figure 6:
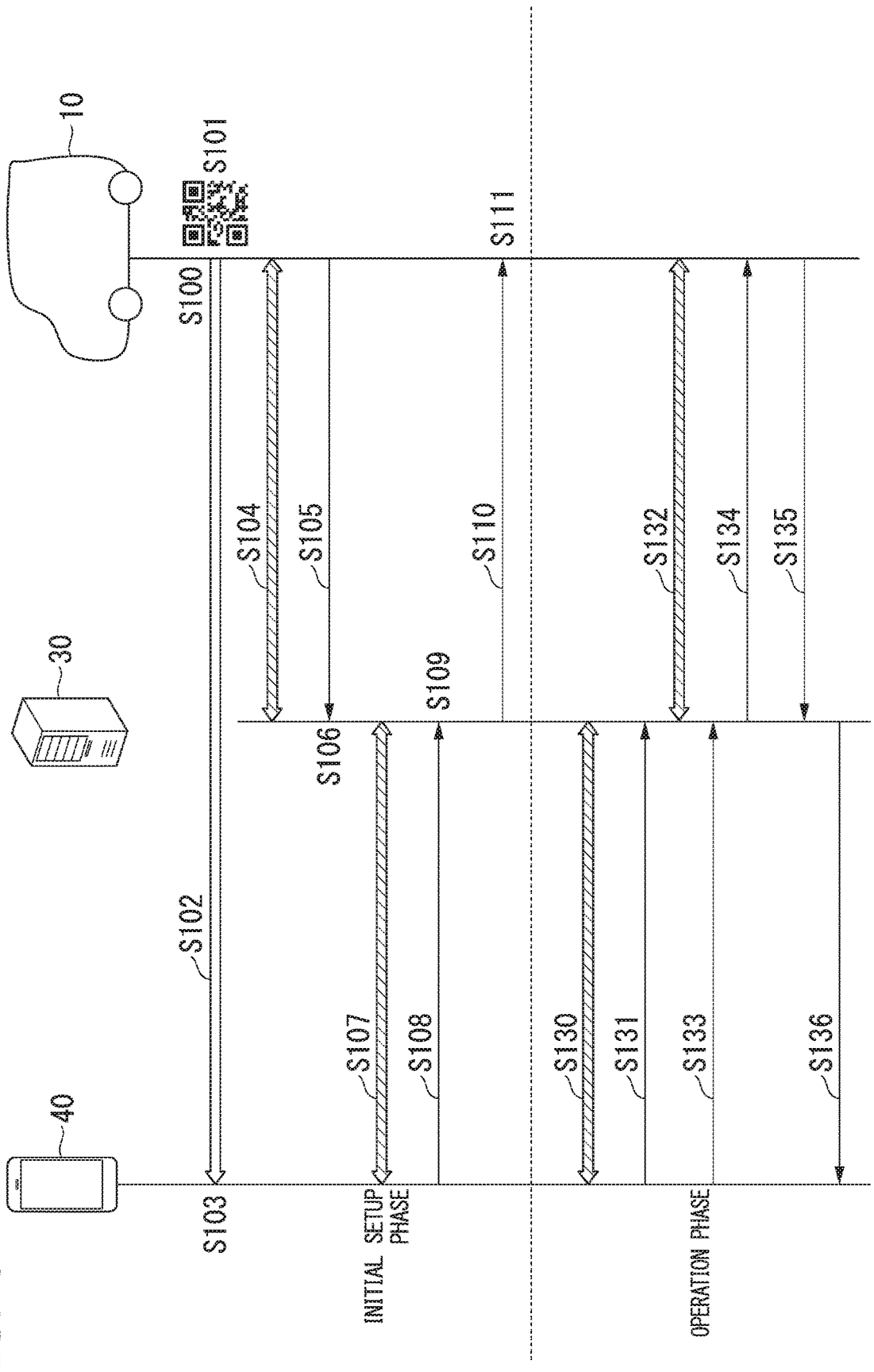
FIG. 6 is a sequence chart showing Example 1 of a vehicle security method according to an embodiment.

Next, Example 1 of the vehicle security method according to the present embodiment will be described with reference to FIG. 6. FIG. 6 is a sequence chart showing Example 1 of the vehicle security method according to the present embodiment. Example 1 of the vehicle security method according to the present embodiment includes the step of registering the terminal device 40 in the server device 30 and the car 10 (an initial setup phase) and the step of accessing the car 10 by means of communication from the terminal device 40 (an operation phase).

(Initial Setup Phase)

(Step S100) The vehicle token issuance unit 54 of the car 10 generates a token of the car 10. The token is information (authentication identification information) used to authenticate the terminal device 40. The token is information including token identification information for identifying the token. The vehicle storage unit 52 stores (holds) the token generated by the vehicle token issuance unit 54.

(Step S101) The token provision unit 55 of the car 10 generates a two-dimensional barcode including a uniform resource locator (URL), which is information of an access destination for the server device 30, a vehicle identification number (VIN) of the car 10, and a token generated by the vehicle token issuance unit 54. The token provision unit 55 causes the two-dimensional barcode to be displayed on a display device inside the car 10. As the display device for displaying the two-dimensional barcode, for example, a display device of the IVI device 15 can be applied. Alternatively, the two-dimensional barcode may be displayed on an instrument panel of the car 10. The VIN is an example of vehicle identification information.

(Step S102) The user of the car 10 reads the two-dimensional barcode displayed on the display device of the car 10 by means of the terminal device 40.

(Step S103) The token acquisition unit 43 of the terminal device 40 reads a two-dimensional barcode (data including a token) and acquires the URL of the server device 30 and the VIN and the token of the car 10 from the two-dimensional barcode. The terminal storage unit 42 stores (holds) the URL of the server device 30 and the VIN and the token of the car 10 that have been acquired in association.

(Step S104) The vehicle communication unit 51 of the car 10 accesses the URL of the server device 30. The server communication unit 31 of the server device 30 and the vehicle communication unit 51 of the car 10 construct a virtual private network (VPN) circuit. Thereafter, in the initial setup phase, the server communication unit 31 and the vehicle communication unit 51 communicate using the VPN circuit.

(Step S105) The token provision unit 55 of the car 10 transmits a terminal registration notification message to the server device 30. The terminal registration notification message is a message including the VIN and the token of the car 10 included in the two-dimensional barcode.

(Step S106) The server communication unit 31 of the server device 30 receives the terminal registration notification message from the car 10. The server device 30 recognizes that access from the terminal device 40 is scheduled according to the terminal registration notification message. The server storage unit 32 stores (holds) the VIN and the token of the terminal registration notification message in association.

(Step S107) The terminal communication unit 41 of the terminal device 40 accesses the URL of the server device 30. The terminal communication unit 41 of the terminal device 40 and the server communication unit 31 of the server device 30 construct a VPN circuit. Thereafter, in the initial setup phase, the terminal communication unit 41 and the server communication unit 31 communicate using the VPN circuit.

(Step S108) The terminal communication unit 41 of the terminal device 40 transmits terminal identification information (a terminal ID) of the terminal device 40 and the VIN and the token of the terminal storage unit 42 to the server device 30. As the terminal ID, for example, an integrated circuit card ID (ICCID), an international mobile subscriber identity (IMSI), an international mobile equipment identity (IMEI), a telephone number, or the like can be applied.

(Step S109) The server communication unit 31 of the server device 30 receives the terminal ID, the VIN, and the token from the terminal device 40. The server determination unit 33 compares the received token with the token of the server storage unit 32 associated with the received VIN. When a comparison result indicates that the two tokens match, the verification of the received token succeeds. When the comparison result indicates that the two tokens do not match, the verification of the received token fails. When the verification of the token succeeds, the server storage unit 32 stores (holds) the terminal ID and the VIN received from the terminal device 40 in association in the server storage unit 32. Thereby, the terminal ID, the VIN, and the token are associated and stored in the server storage unit 32. When the verification of the token succeeds, the authentication in the server device 30 at the time of registration of the terminal device 40 succeeds. When the verification of the token succeeds, the subsequent processing is performed.

On the other hand, when the verification of the token fails, the initial setup phase is ended. When the verification of the token fails, the authentication in the server device 30 at the time of registration of the terminal device 40 fails.

(Step S110) The server communication unit 31 of the server device 30 transmits the terminal ID and the token of the terminal device 40 for which the verification of the token has succeeded to the car 10.

(Step S111) The vehicle communication unit 51 of the car 10 receives the terminal ID and the token from the server device 30. The vehicle determination unit 53 compares the received token with the token of the vehicle storage unit 52. When a comparison result indicates that the two tokens match, the verification of the received token succeeds. When the comparison result indicates that the two tokens do not match, the verification of the received token fails.

When the verification of the token succeeds, the vehicle storage unit 52 stores (holds) the terminal ID received from the server device 30. When the verification of the token succeeds, the authentication in the car 10 at the time of registration of the terminal device 40 of the terminal ID succeeds. On the other hand, when the verification of the token fails, the initial setup phase is ended. When the verification of the token fails, the authentication in the car 10 at the time of registration of the terminal device 40 of the terminal ID fails.

(Operation Phase)

(Step S130) The terminal communication unit 41 of the terminal device 40 accesses the URL of the server device 30. The terminal communication unit 41 of the terminal device 40 and the server communication unit 31 of the server device 30 construct a VPN circuit. Thereafter, in the operation phase, the terminal communication unit 41 and the server communication unit 31 communicate using the VPN circuit.

(Step S131) The terminal communication unit 41 of the terminal device 40 transmits a login message including the terminal ID of the terminal device 40 and the token of the terminal storage unit 42 to the server device 30.

The server communication unit 31 of the server device 30 receives the login message from the terminal device 40. The server determination unit 33 compares the token of the received login message with a token of the server storage unit 32 associated with the terminal ID of the received login message. When a comparison result indicates that the two tokens match, the verification of the token of the received login message succeeds. When the comparison result indicates that the two tokens do not match, the verification of the token of the received login message fails. When the verification of the token succeeds, a result of determining the login message is authentication success and the authentication in the server device 30 at the time of an operation of the terminal device 40 succeeds. When the verification of the token succeeds, the subsequent processing is performed.

On the other hand, when the verification of the token fails, the operation phase is ended. When the verification of the token fails, the result of determining the login message is authentication failure and the authentication in the server device 30 at the time of an operation of the terminal device 40 fails.

(Step S132) The server communication unit 31 of the server device 30 accesses the car 10 of the VIN of the server storage unit 32 associated with the terminal ID of the login message when the result of determining the login message is authentication success. The server communication unit 31 of the server device 30 and the vehicle communication unit 51 of the car 10 construct a VPN circuit. Thereafter, in the operation phase, the server communication unit 31 and the vehicle communication unit 51 communicate using the VPN circuit.

(Step S133) The terminal communication unit 41 of the terminal device 40 transmits an operation command of the car 10 to the server device 30. Examples of the operation command of the car 10 include an operation command for executing an operation of an in-vehicle device of the car 10, for example, an operation of starting and stopping an air conditioner, unlocking a door, or the like. Also, the operation command of the car 10 may be an operation command for implementing the monitoring of a state of the car 10 by means of communication. The operation command corresponds to vehicle control information.

(Step S134) The server communication unit 31 of the server device 30 receives the operation command from the terminal device 40 and transmits the received operation command to the car 10.

(Step S135) The vehicle communication unit 51 of the car 10 receives the operation command from the server device 30. The car 10 executes the received operation command. The vehicle communication unit 51 returns a result of executing the operation command to the server device 30.

(Step S136) The server communication unit 31 of the server device 30 receives the result of executing the operation command from the car 10 and transmits the received result of executing the operation command to the terminal device 40. Also, the server device 30 may record a log related to the operation command in the server storage unit 32. The log stores an execution date and time of the operation command, the operation command, the result of executing the operation command, the terminal ID of the terminal device 40 that is a transmission source of the operation command, and the like.

Example 2 of Vehicle Security Method

Figure 7:
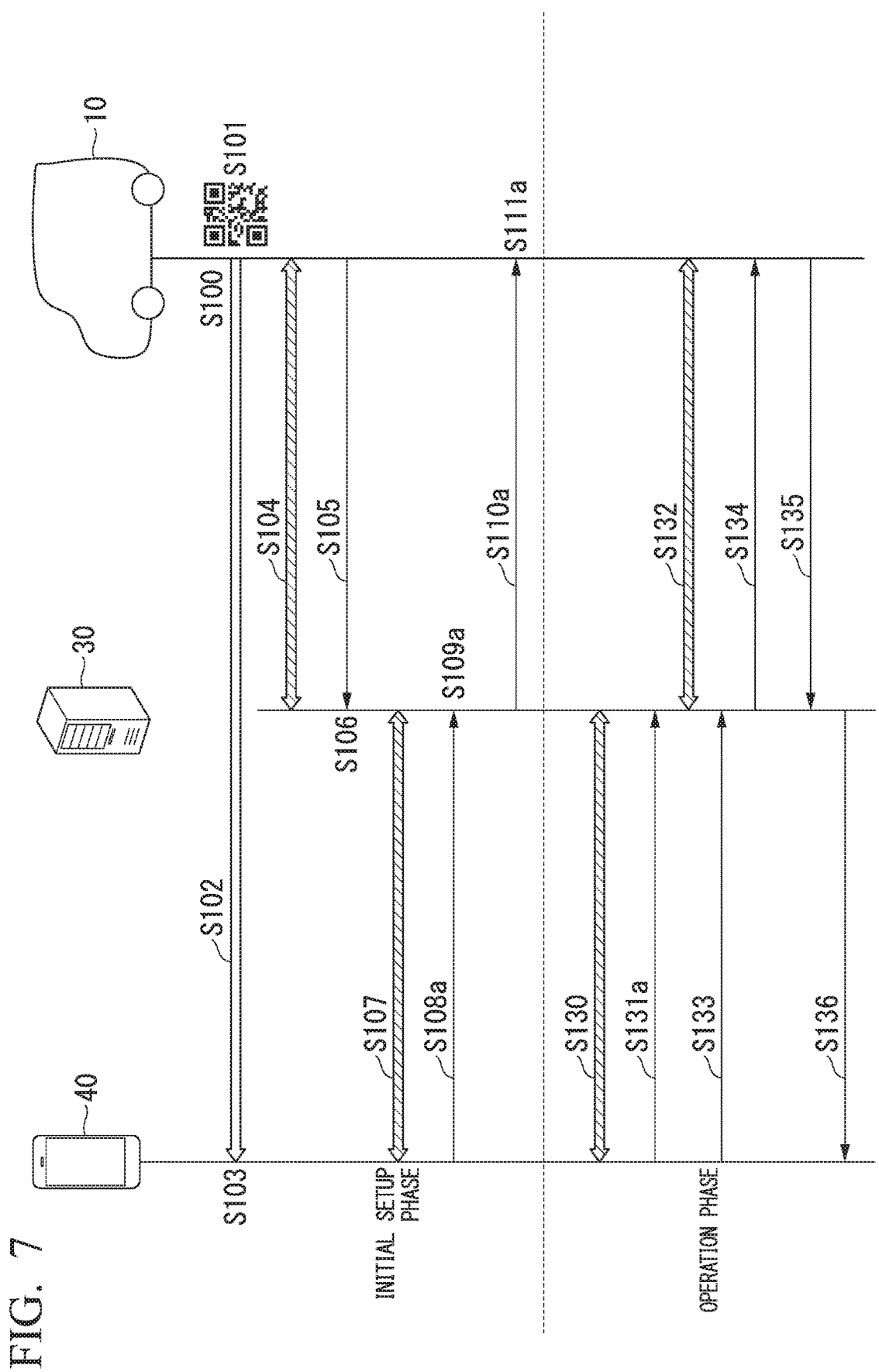
FIG. 7 is a sequence chart showing Example 2 of a vehicle security method according to an embodiment.

Next, Example 2 of the vehicle security method according to the present embodiment will be described with reference to FIG. 7. FIG. 7 is a sequence chart showing Example 2 of the vehicle security method according to the present embodiment. In FIG. 7, parts corresponding to the respective steps of FIG. 6 are denoted by the same reference signs. Example 2 of the vehicle security method according to the present embodiment includes an initial setup phase and an operation phase as in Example 1 of the vehicle security method.

(Initial Setup Phase)

Steps S100 to S107 are the same as those of the above-described Example 1 (FIG. 6) of the vehicle security method. After steps S100 to S107, step S108a is executed.

(Step S108a) The terminal communication unit 41 of the terminal device 40 transmits a terminal ID of the terminal device 40, a VIN and a token of the terminal storage unit 42, and a password to the server device 30. The password is input to the terminal device 40 by the user.

(Step S109a) The server communication unit 31 of the server device 30 receives the terminal ID, the VIN, the token, and the password from the terminal device 40. The server determination unit 33 compares the received token with a token of the server storage unit 32 associated with the received VIN. When a comparison result indicates that the two tokens match, the verification of the received token succeeds. When the comparison result indicates that the two tokens do not match, the verification of the received token fails. When the verification of the token succeeds, the server storage unit 32 stores the terminal ID, the password, and the VIN received from the terminal device 40 in association in the server storage unit 32. Thereby, the terminal ID, the password, the VIN, and the token are associated and stored (held) in the server storage unit 32. When the verification of the token succeeds, the authentication in the server device 30 at the time of registration of the terminal device 40 succeeds. When the verification of the token succeeds, the subsequent processing is performed.

On the other hand, when the verification of the token fails, the initial setup phase is ended. When the verification of the token fails, the authentication in the server device 30 at the time of registration of the terminal device 40 fails.

(Step S110a) The server communication unit 31 of the server device 30 transmits the terminal ID, the password, and the token of the terminal device 40 for which the verification of the token has succeeded to the car 10.

(Step S111a) The vehicle communication unit 51 of the car 10 receives the terminal ID, the password, and the token from the server device 30. The vehicle determination unit 53 compares the received token with the token of the vehicle storage unit 52. When a comparison result indicates that the two tokens match, the verification of the received token succeeds. When the comparison result indicates that the two tokens do not match, the verification of the received token fails. When the verification of the token succeeds, the vehicle storage unit 52 stores (holds) the terminal ID and the password received from the server device 30 in association. When the verification of the token succeeds, the authentication in the car 10 at the time of registration of the terminal device 40 of the terminal ID succeeds. On the other hand, when the verification of the token fails, the initial setup phase is ended. When the verification of the token fails, the authentication in the car 10 at the time of registration of the terminal device 40 of the terminal ID fails.

(Operation Phase)

Step S130 is the same as that of the above-described Example 1 (FIG. 6) of the vehicle security method. After step S130, step S131a is executed.

(Step S131a) The terminal communication unit 41 of the terminal device 40 transmits a login message including the terminal ID and the password of the terminal device 40 to the server device 30. The password may be a password input to the terminal device 40 by the user in step S131a or may be a password that is saved after being input from the user in step S108a of the initial setup phase.

The server communication unit 31 of the server device 30 receives the login message from the terminal device 40. The server determination unit 33 compares the password of the received login message with a password of the server storage unit 32 associated with the terminal ID of the received login message. When a comparison result indicates that the two passwords match, the verification of the password of the received login message succeeds. When the comparison result indicates that the two passwords do not match, the verification of the password of the received login message fails. When the verification of the password succeeds, a result of determining the login message is authentication success and the authentication in the server device 30 at the time of an operation of the terminal device 40 succeeds. When the verification of the password succeeds, the subsequent processing is performed.

On the other hand, when the verification of the password fails, the operation phase is ended. When the verification of the password fails, the result of determining the login message is authentication failure and the authentication in the server device 30 at the time of an operation of the terminal device 40 fails.

Next, steps S132 to S136 are performed. Steps S132 to S136 are the same as those of the above-described Example 1 (FIG. 6) of the vehicle security method.

Example 3 of Vehicle Security Method

Figure 8:
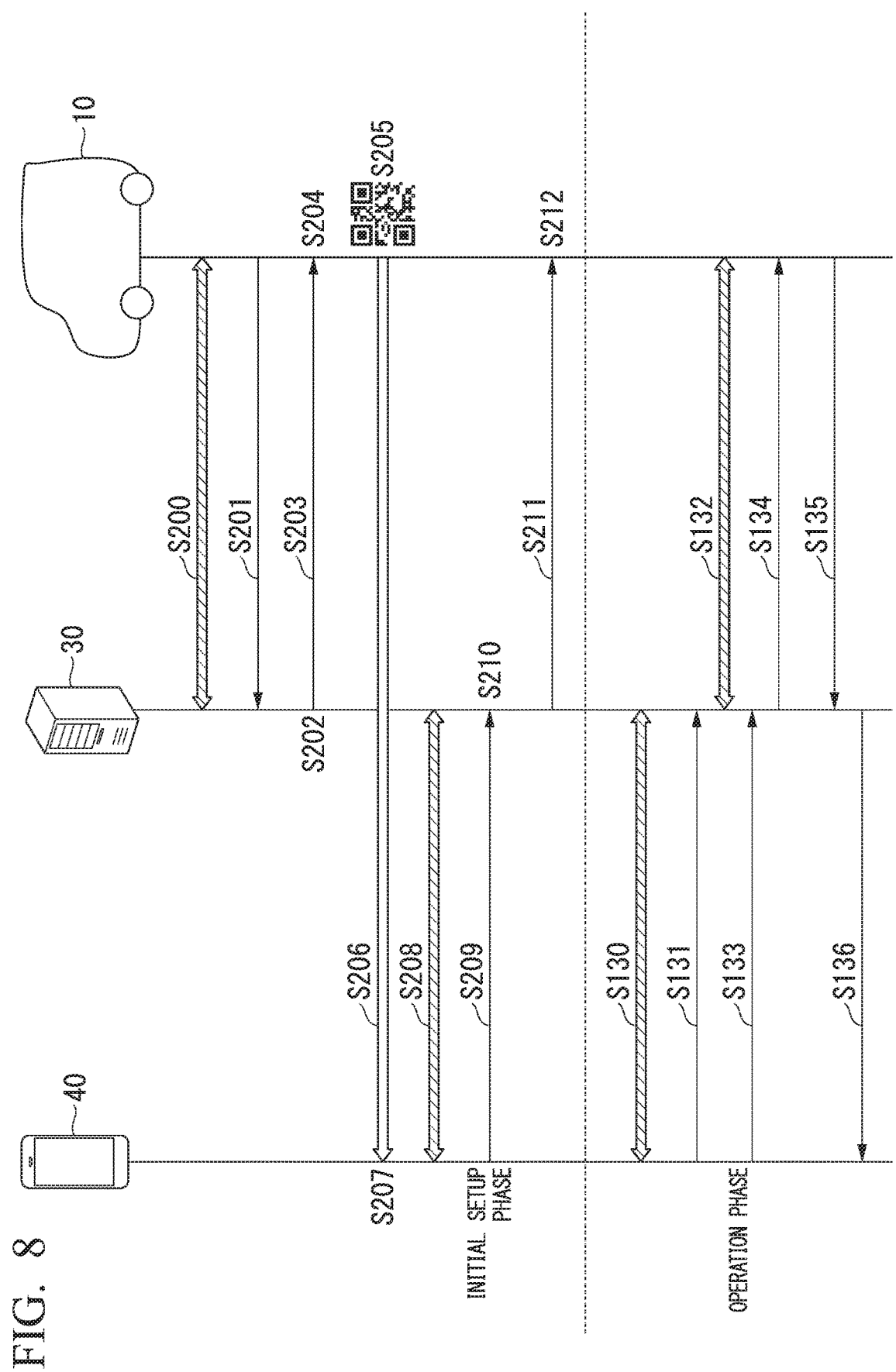
FIG. 8 is a sequence chart showing Example 3 of a vehicle security method according to an embodiment.

Next, Example 3 of the vehicle security method according to the present embodiment will be described with reference to FIG. 8. FIG. 8 is a sequence chart showing Example 3 of the vehicle security method according to the present embodiment. In FIG. 8, parts corresponding to the respective steps of FIG. 6 are denoted by the same reference signs. Example 3 of the vehicle security method according to the present embodiment includes an initial setup phase and an operation phase as in Example 1 of the vehicle security method.

(Initial Setup Phase)

(Step S200) The vehicle communication unit 51 of the car 10 accesses a URL of the server device 30. The server communication unit 31 of the server device 30 and the vehicle communication unit 51 of the car 10 construct a VPN circuit. Thereafter, in the initial setup phase, the server communication unit 31 and the vehicle communication unit 51 communicate using the VPN circuit.

(Step S201) The vehicle communication unit 51 of the car 10 transmits a login message including user identification information ID and a password PWD and a VIN of the car 10 to the server device 30. The user identification information ID and the password PWD are registered as a user in advance in the server device 30. The server storage unit 32 of the server device 30 stores a set of user identification information ID and password PWD registered as the user.

The server communication unit 31 of the server device 30 receives the login message and the VIN from the car 10. The server determination unit 33 compares the password PWD of the received login message with a password PWD of the server storage unit 32 associated with the user identification information ID of the received login message. When a comparison result indicates that the two passwords match, a result of determining the received login message is authentication success. When the comparison result indicates that the two passwords do not match, the result of determining the received login message is authentication failure. When the result of determining the received login message is authentication success, the subsequent processing is performed. On the other hand, when the result of determining the received login message is authentication failure, the initial setup phase is ended.

(Step S202) The server token issuance unit 34 of the server device 30 generates a token of the car 10. The server storage unit 32 stores (holds) the token generated by the server token issuance unit 34 and the VIN received from the car 10 in association.

(Step S203) The server communication unit 31 of the server device 30 transmits the token generated by the server token issuance unit 34 to the car 10.

(Step S204) The vehicle communication unit 51 of the car 10 receives the token from the server device 30. The vehicle storage unit 52 stores (holds) the received token.

(Step S205) The token provision unit 55 of the car 10 generates a two-dimensional barcode including the URL of the server device 30, the VIN of the car 10, and the token received from the server device 30. The token provision unit 55 causes the two-dimensional barcode to be displayed on the display device inside own car 10.

(Step S206) The user of the car 10 reads the two-dimensional barcode displayed on the display device of the car 10 by the terminal device 40. As described above, the two-dimensional barcode includes the URL of the server device 30, the VIN of the car 10, and the token received from the server device 30.

(Step S207) The token acquisition unit 43 of the terminal device 40 reads the two-dimensional barcode (barcode reader) and acquires the URL of the server device 30 and the VIN and the token of the car 10 from the two-dimensional barcode. The terminal storage unit 42 stores (holds) the URL of the server device 30 and the VIN and the token of the car 10 that have been acquired in association.

(Step S208) The terminal communication unit 41 of the terminal device 40 accesses the URL of the server device 30. The terminal communication unit 41 of the terminal device 40 and the server communication unit 31 of the server device 30 construct a VPN circuit. Thereafter, in the initial setup phase, the terminal communication unit 41 and the server communication unit 31 communicate using the VPN circuit.

(Step S209) The terminal communication unit 41 of the terminal device 40 transmits the terminal ID of the terminal device 40 and the VIN and the token of the terminal storage unit 42 to the server device 30.

(Step S210) The server communication unit 31 of the server device 30 receives the terminal ID, the VIN, and the token from the terminal device 40. The server determination unit 33 compares the received token with the token of the server storage unit 32 associated with the received VIN. When a comparison result indicates that the two tokens match, the verification of the received token succeeds. When the comparison result indicates that the two tokens do not match, the verification of the received token fails. When the verification of the token succeeds, the server storage unit 32 stores (holds) the terminal ID and the VIN received from the terminal device 40 in association in the server storage unit 32. Thereby, the terminal ID, the VIN, and the token are associated and stored in the server storage unit 32. When the verification of the token succeeds, the authentication in the server device 30 at the time of registration of the terminal device 40 succeeds. When the verification of the token succeeds, the subsequent processing is performed.

On the other hand, when the verification of the token fails, the initial setup phase is ended. When the verification of the token fails, the authentication in the server device 30 at the time of registration of the terminal device 40 fails.

(Step S211) The server communication unit 31 of the server device 30 transmits the terminal ID and the token of the terminal device 40 for which the verification of the token has succeeded to the car 10.

(Step S212) The vehicle communication unit 51 of the car 10 receives the terminal ID and the token from the server device 30. The vehicle determination unit 53 compares the received token with the token of the vehicle storage unit 52. When a comparison result indicates that the two tokens match, the verification of the received token succeeds. When the comparison result indicates that the two tokens do not match, the verification of the received token fails.

When the verification of the token succeeds, the vehicle storage unit 52 stores (holds) the terminal ID received from the server device 30. When the verification of the token succeeds, the authentication in the car 10 at the time of registration of the terminal device 40 of the terminal ID succeeds. On the other hand, when the verification of the token fails, the initial setup phase is ended. When the verification of the token fails, the authentication in the car 10 at the time of registration of the terminal device 40 of the terminal ID fails.

(Operation Phase)

The operation phase (steps S130 to S136) of Example 3 of the vehicle security method is the same as that of the above-described Example 1 (FIG. 6) of the vehicle security method.

Example 4 of Vehicle Security Method

Figure 9:
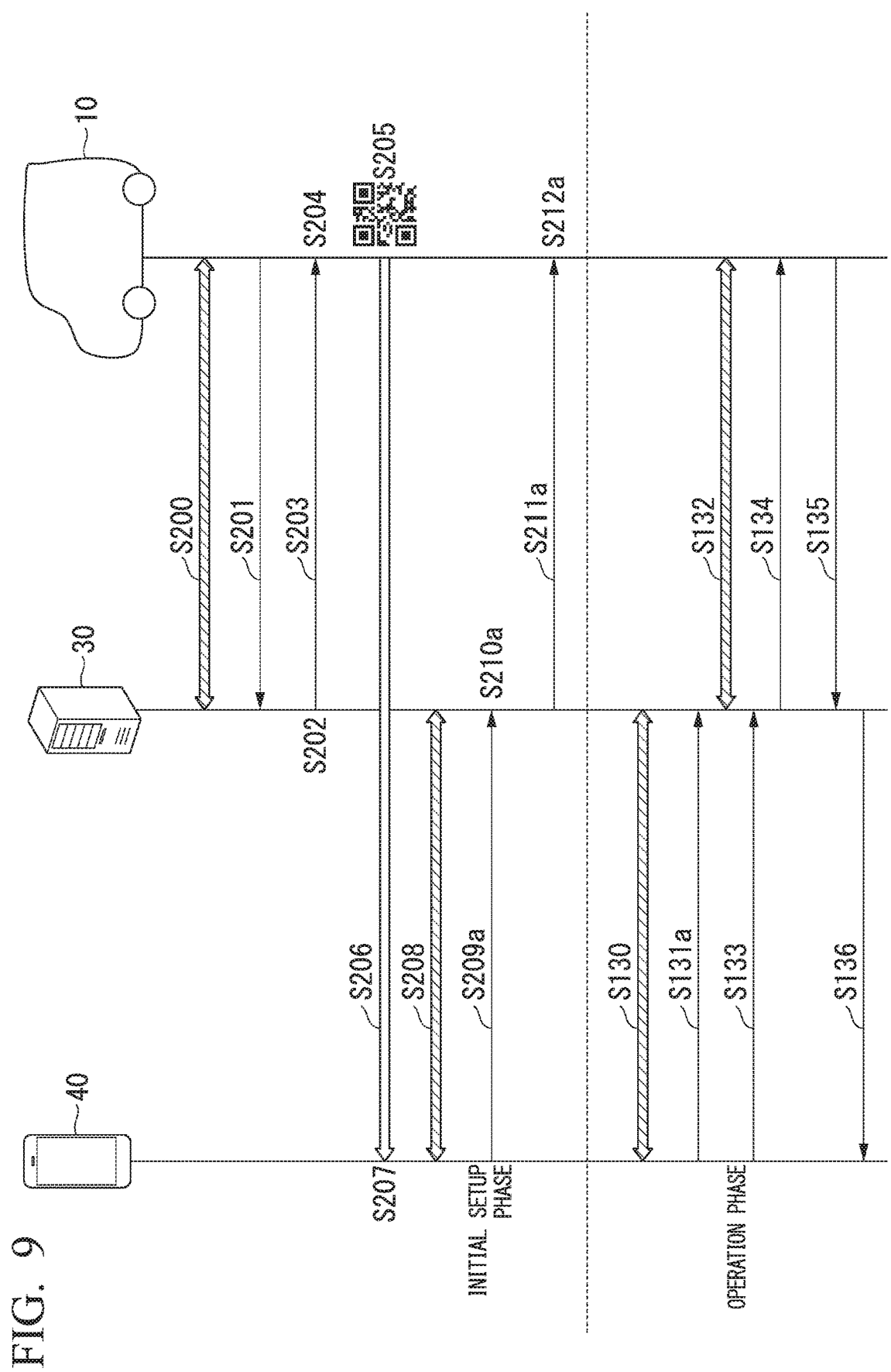
FIG. 9 is a sequence chart showing Example 4 of a vehicle security method according to an embodiment.

Next, Example 4 of the vehicle security method according to the present embodiment will be described with reference to FIG. 9. FIG. 9 is a sequence chart showing Example 4 of the vehicle security method according to the present embodiment. In FIG. 9, parts corresponding to the respective steps of FIGS. 7 and 8 are denoted by the same reference signs. Example 4 of the vehicle security method according to the present embodiment includes an initial setup phase and an operation phase as in Example 1 of the vehicle security method.

(Initial Setup Phase)

Steps S200 to S208 are the same as those of the above-described Example 3 (FIG. 8) of the vehicle security method.

After steps S200 to S208, step S209*a* is executed.

(Step S209*a*) The terminal communication unit 41 of the terminal device 40 transmits a terminal ID of the terminal device 40, a VIN and a token of the terminal storage unit 42, and a password to the server device 30. The password is input to the terminal device 40 by the user.

(Step S210*a*) The server communication unit 31 of the server device 30 receives the terminal ID, the VIN, the token, and the password from the terminal device 40. The server determination unit 33 compares the received token with a token of the server storage unit 32 associated with the received VIN. When a comparison result indicates that the two tokens match, the verification of the received token succeeds. When the comparison result indicates that the two tokens do not match, the verification of the received token fails. When the verification of the token succeeds, the server storage unit 32 stores (holds) the terminal ID, the password, and the VIN received from the terminal device 40 in association in the server storage unit 32. Thereby, the terminal ID, the password, the VIN, and the token are associated and stored in the server storage unit 32. When the verification of the token succeeds, the authentication in the server device 30 at the time of registration of the terminal device 40 succeeds. When the verification of the token succeeds, the subsequent processing is performed.

On the other hand, when the verification of the token fails, the initial setup phase is ended. When the verification of the token fails, the authentication in the server device 30 at the time of registration of the terminal device 40 fails.

(Step S211*a*) The server communication unit 31 of the server device 30 transmits the terminal ID, the password, and the token of the terminal device 40 for which the verification of the token has succeeded to the car 10.

(Step S212*a*) The vehicle communication unit 51 of the car 10 receives the terminal ID, the password, and the token from the server device 30. The vehicle determination unit 53 compares the received token with the token of the vehicle storage unit 52. When a comparison result indicates that the two tokens match, the verification of the received token succeeds. When the comparison result indicates that the two tokens do not match, the verification of the received token fails. When the verification of the token succeeds, the vehicle storage unit 52 stores (holds) the terminal ID and the password received from the server device 30 in association. When the verification of the token succeeds, the authentication in the car 10 at the time of registration of the terminal device 40 of the terminal ID succeeds. On the other hand, when the verification of the token fails, the initial setup phase is ended. When the verification of the token fails, the authentication in the car 10 at the time of registration of the terminal device 40 of the terminal ID fails.
(Operation Phase)

The operation phase (steps S130, S131a, and S132 to S136) of Example 4 of the vehicle security method is the same as that of the above-described Example 2 (FIG. 7) of the vehicle security method.

Example 5 of the Vehicle Security Method

Figure 10:
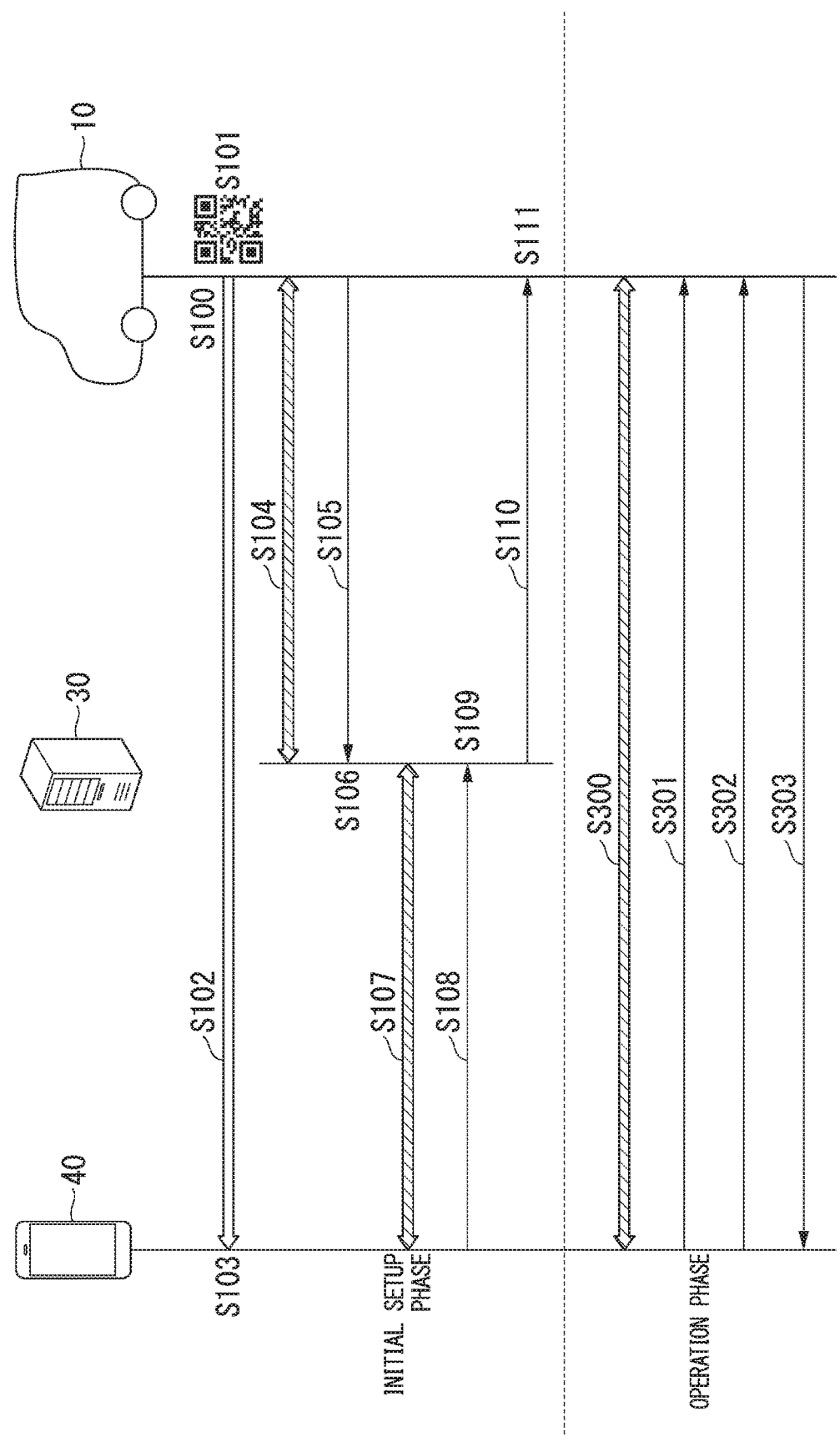
FIG. 10 is a sequence chart showing Example 5 of a vehicle security method according to an embodiment.

Next, Example 5 of the vehicle security method according to the present embodiment will be described with reference to FIG. 10. FIG. 10 is a sequence chart showing Example 5 of the vehicle security method according to the present embodiment. In FIG. 10, parts corresponding to the respective steps of FIG. 6 are denoted by the same reference signs. Example 5 of the vehicle security method according to the present embodiment includes an initial setup phase and an operation phase as in Example 1 (FIG. 6) of the vehicle security method.
(Initial Setup Phase)

The initial setup phase (steps S100 and S111) of Example 5 of the vehicle security method is the same as that of the above-described Example 1 (FIG. 6) of the vehicle security method.
(Operation Phase)

(Step S300) The terminal communication unit 41 of the terminal device 40 and the vehicle communication unit 51 of the car 10 establish the communication path 106 of a near-field wireless communication scheme. Thereafter, in the operation phase, the terminal communication unit 41 and the vehicle communication unit 51 perform near-field wireless communication via the communication path 106.

(Step S301) The terminal communication unit 41 of the terminal device 40 transmits a login message including a terminal ID of the terminal device 40 and a token of the terminal storage unit 42 to the car 10.

The vehicle communication unit 51 of the car 10 receives the login message from the terminal device 40.

The vehicle determination unit 53 compares the token of the received login message with a token of the vehicle storage unit 52. When a comparison result indicates that the two tokens match, the verification of the token of the received login message succeeds. When the comparison result indicates that the two tokens do not match, the verification of the token of the received login message fails. When the verification of the token succeeds, a result of determining the login message is authentication success and the authentication at the time of an operation of the terminal device 40 succeeds. When the verification of the token succeeds, the subsequent processing is performed.

On the other hand, when the verification of the token fails, the operation phase is ended. When the verification of the token fails, the result of determining the login message is authentication failure and the authentication at the time of an operation of the terminal device 40 fails.

(Step S302) The terminal communication unit 41 of the terminal device 40 transmits an operation command to the car 10.

(Step S303) The vehicle communication unit 51 of the car 10 receives the operation command from the terminal device 40. The car 10 executes the received operation command. The vehicle communication unit 51 returns a result of executing the operation command to the terminal device 40. Also, the car 10 may record a log related to the operation command in the vehicle storage unit 52. The log stores an execution date and time of the operation command, the operation command, the result of executing the operation command, a terminal ID of the terminal device 40 that is a transmission source of the operation command, and the like.

Example 6 of Vehicle Security Method

Figure 11:
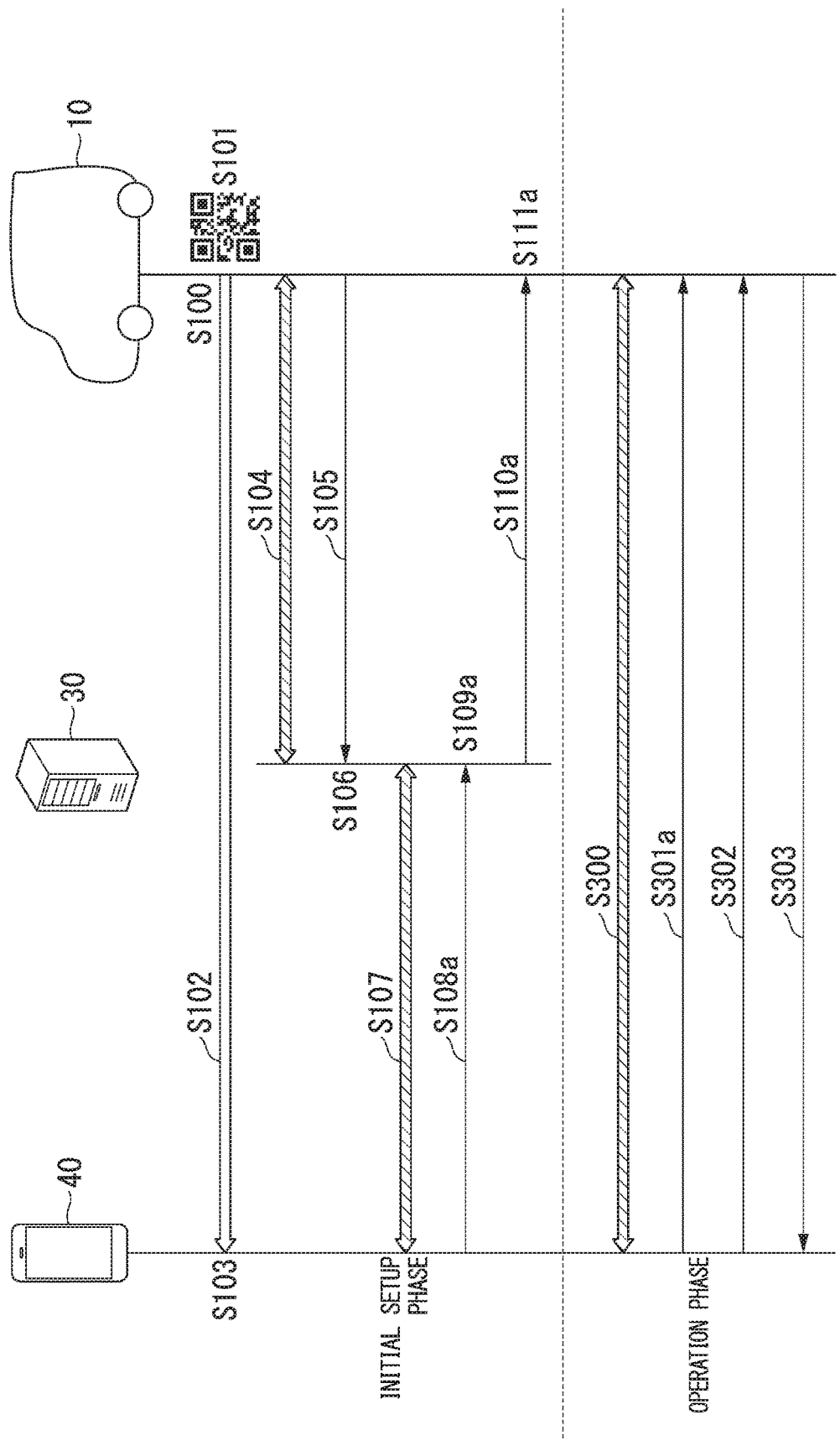
FIG. 11 is a sequence chart showing Example 6 of a vehicle security method according to an embodiment.

Next, Example 6 of the vehicle security method according to the present embodiment will be described with reference to FIG. 11. FIG. 11 is a sequence chart showing Example 6 of the vehicle security method according to the present embodiment. In FIG. 11, parts corresponding to the respective steps of FIGS. 7 and 10 are denoted by the same reference signs. Example 6 of the vehicle security method according to the present embodiment includes an initial setup phase and an operation phase as in Example 1 of the vehicle security method.
(Initial Setup Phase)

The initial setup phase (steps S100 to S107 and S108a to S111a) of Example 6 of the vehicle security method is the same as that of above-described Example 2 (FIG. 7) of the vehicle security method.
(Operation Phase)

(Step S300) The terminal communication unit 41 of the terminal device 40 and the vehicle communication unit 51 of the car 10 establish the communication path 106 of a near-field wireless communication scheme. Thereafter, in the operation phase, the terminal communication unit 41 and the vehicle communication unit 51 perform near-field wireless communication via the communication path 106.

(Step S301a) The terminal communication unit 41 of the terminal device 40 transmits a login message including a terminal ID and a password of the terminal device 40 to the car 10. The password may be a password input to the terminal device 40 by the user in step S301a or may be a password that is saved after being input by the user in S108a of the initial setup phase.

The vehicle communication unit 51 of the car 10 receives the login message from the terminal device 40. The vehicle determination unit 53 compares the password of the received login message with a password of the vehicle storage unit 52 associated with the terminal ID of the received login message.

When a comparison result indicates that the two passwords match, the verification of the password of the received login message succeeds. When the comparison result indicates that the two passwords do not match, the verification of the password of the received login message fails. When the verification of the password succeeds, a result of determining the login message is authentication success and the authentication at the time of an operation of the terminal device 40 succeeds. When the verification of the password succeeds, the subsequent processing is performed.

On the other hand, when the verification of the password fails, the operation phase is ended. When the verification of the password fails, the result of determining the login message is authentication failure and the authentication at the time of an operation of the terminal device 40 fails.

Next, steps S302 and S303 are executed. Steps S302 and S303 are the same as those of the above-described Example 5 (FIG. 10) of the vehicle security method.

Example 7 of Vehicle Security Method

Figure 12:
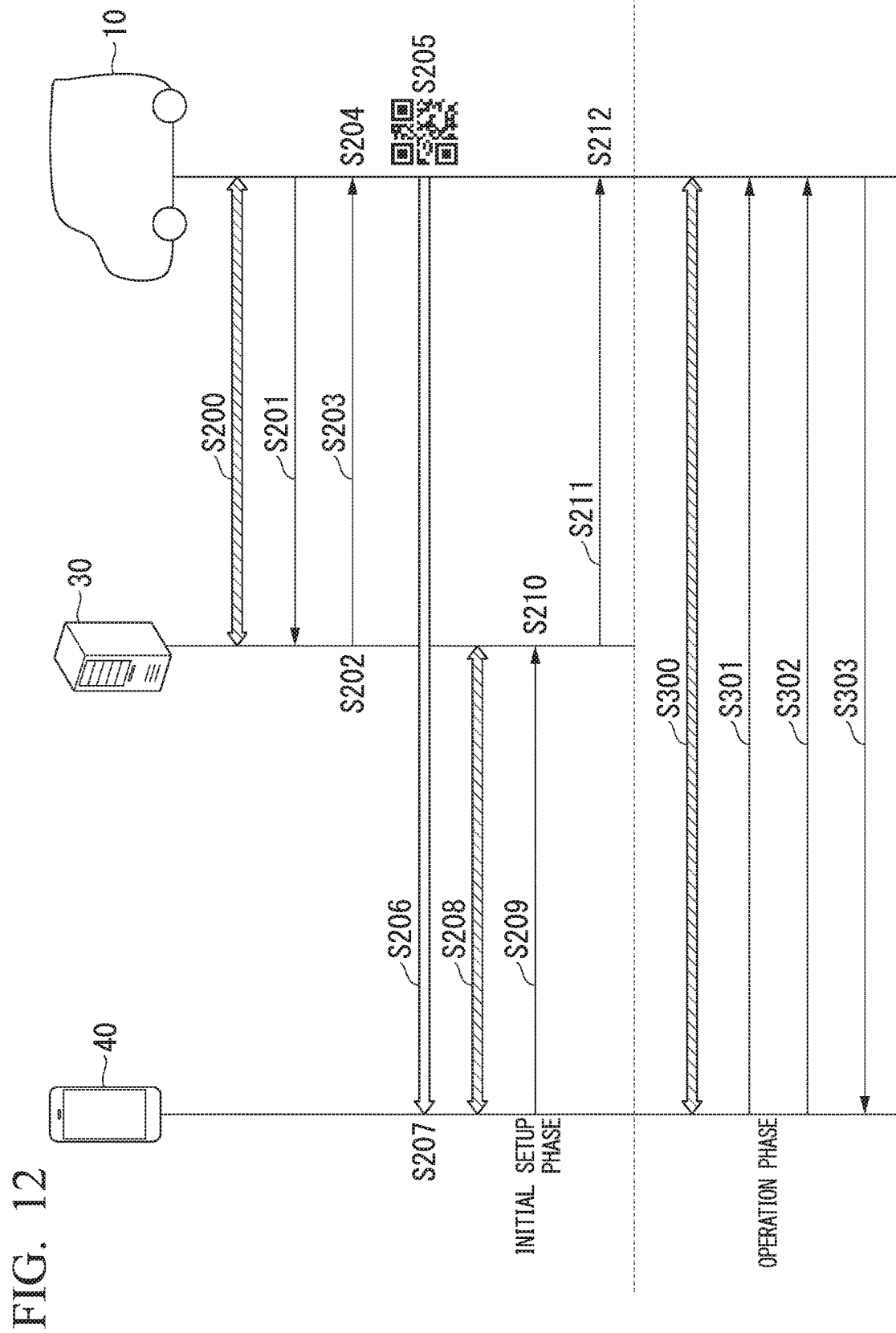
FIG. 12 is a sequence chart showing Example 7 of a vehicle security method according to an embodiment.

Next, Example 7 of the vehicle security method according to the present embodiment will be described with reference to FIG. 12. FIG. 12 is a sequence chart showing Example 7 of the vehicle security method according to the present embodiment. In FIG. 12, parts corresponding to the respective steps of FIGS. 8 and 10 are denoted by the same reference signs. Example 6 of the vehicle security method according to the present embodiment includes an initial setup phase and an operation phase as in Example 1 of the vehicle security method.
(Initial Setup Phase)

The initial setup phase (steps S200 to S212) of Example 7 of the vehicle security method is the same as that of the above-described Example 3 (FIG. 8) of the vehicle security method.
(Operation Phase)

The operation phase (steps S300 to S303) of Example 7 of the vehicle security method is the same as that of the above-described Example 5 (FIG. 10) of the vehicle security method.

Example 8 of Vehicle Security Method

Figure 13:
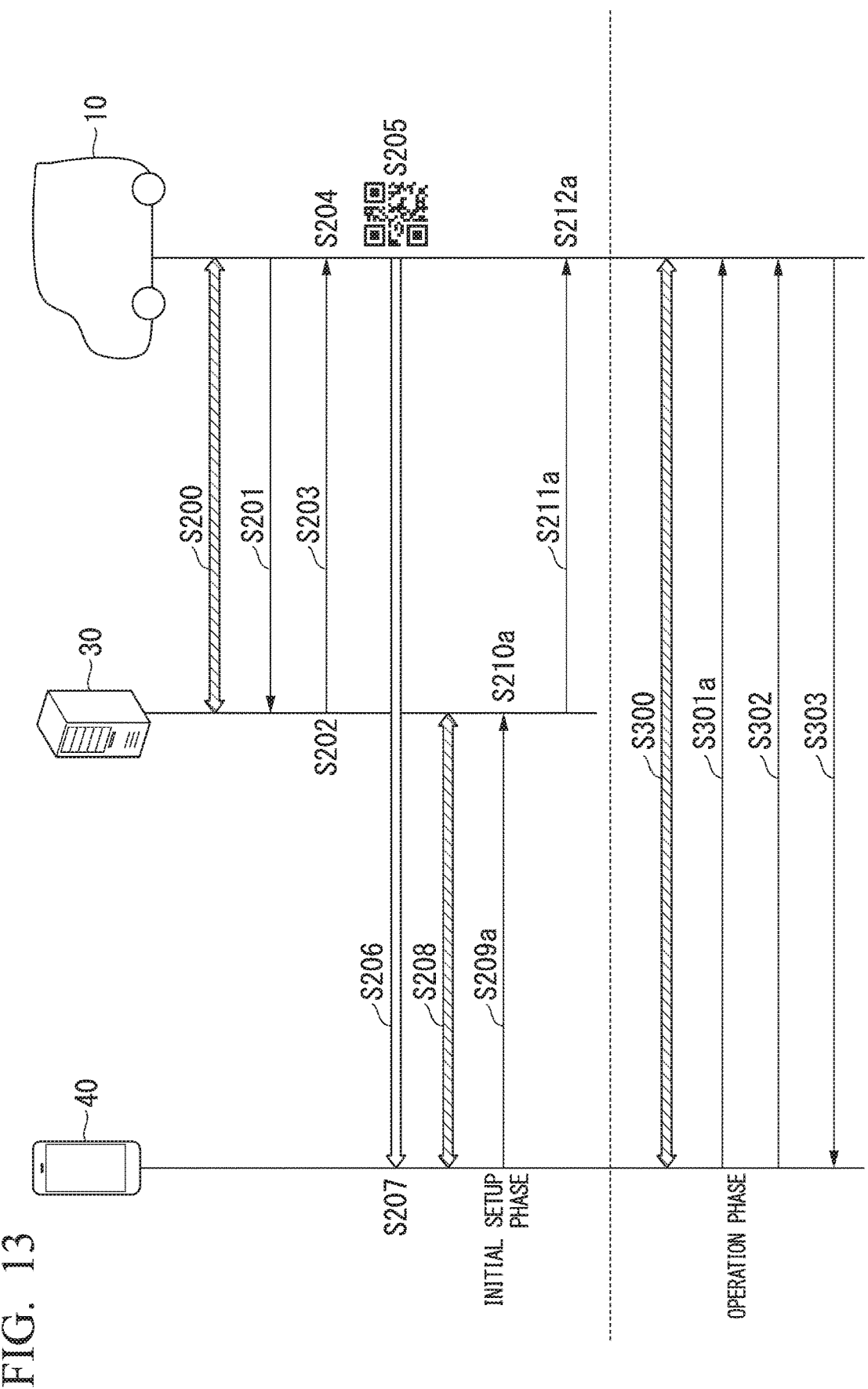
FIG. 13 is a sequence chart showing Example 8 of a vehicle security method according to an embodiment.

Next, Example 8 of the vehicle security method according to the present embodiment will be described with reference to FIG. 13. FIG. 13 is a sequence chart showing Example 8 of the vehicle security method according to the present embodiment. In FIG. 13, parts corresponding to the respective steps of FIGS. 9 and 11 are denoted by the same reference signs. Example 6 of the vehicle security method according to the present embodiment includes an initial setup phase and an operation phase as in Example 1 of the vehicle security method.
(Initial Setup Phase)

The initial setup phase (steps S200 to S208 and S209a to S212a) of Example 8 of the vehicle security method is the same as that of the above-described Example 4 (FIG. 9) of the vehicle security method.
(Operation Phase)

The operation phase (steps S300, S301a, S302, and S303) of Example 8 of the vehicle security method is the same as that of the above-described Example 6 (FIG. 11) of the vehicle security method.

The above provides descriptions of examples 1 to 8 of the vehicle security method.

According to the above-described examples 1 to 8 of the vehicle security method, the terminal device 40 (the terminal ID) that is valid with respect to the car 10 is registered on the basis of the token in the initial setup phase. Thereby, it is possible to improve the security when the car 10 is accessed by means of communication from the terminal device 40 such as a smartphone. For example, whether the car 10 has been illegally accessed by spoofing of the terminal device 40 can be checked. Also, the association between the terminal device 40 and the car 10 can be managed via the server device 30.

Also, according to the above-described examples 1 to 8 of the vehicle security method, in the operation phase, the car 10 can execute the operation command from the terminal device 40 (the terminal ID) registered in the initial setup phase and the car 10 cannot execute the operation command from the terminal device 40 (the terminal ID) unregistered in the initial setup phase.

Also, according to the above-described examples 1 to 4 (FIGS. 6 to 9) of the vehicle security method, in the operation phase, an operation command from the terminal device 40 is transmitted to the car 10 via the server device 30. Thereby, in the server device 30, the access from the terminal device 40 to the car 10 can be optionally stopped.

Also, according to Example 2 (FIG. 7), Example 4 (FIG. 9), Example 6 (FIG. 11) and Example 8 (FIG. 13) of the vehicle security method described above, it is possible to authenticate the terminal device 40 according to a password input from the user by registering a password corresponding to the token. Thereby, the intention of the user who uses the terminal device 40 can be confirmed.

Also, although a two-dimensional barcode is displayed on the display device in the above-described embodiment, the two-dimensional barcode may be printed and attached to the inside of the car 10. Also, instead of the two-dimensional barcode, data of the URL of the server device 30 and the VIN and the token of the car 10 may be provided to the terminal device 40 by means of another method. For example, a configuration in which data of the URL of the server device 30 and the VIN and the token of the car 10 may be transmitted within the car 10 using a near-field communication (NFC) tag may be adopted.

As described above, it is possible to contribute to the provision of the token of the car 10 to the valid user of the car 10 by providing the token of the car 10 within the car 10 by displaying the two-dimensional barcode on the display device installed in the car 10 or the like. For example, when there is no owner of an immobilizer of the car 10 and no one can enter the car 10, the token of the car 10 can be provided to a valid user who owns the immobilizer.

Example 9 of Vehicle Security Method

Figure 14:
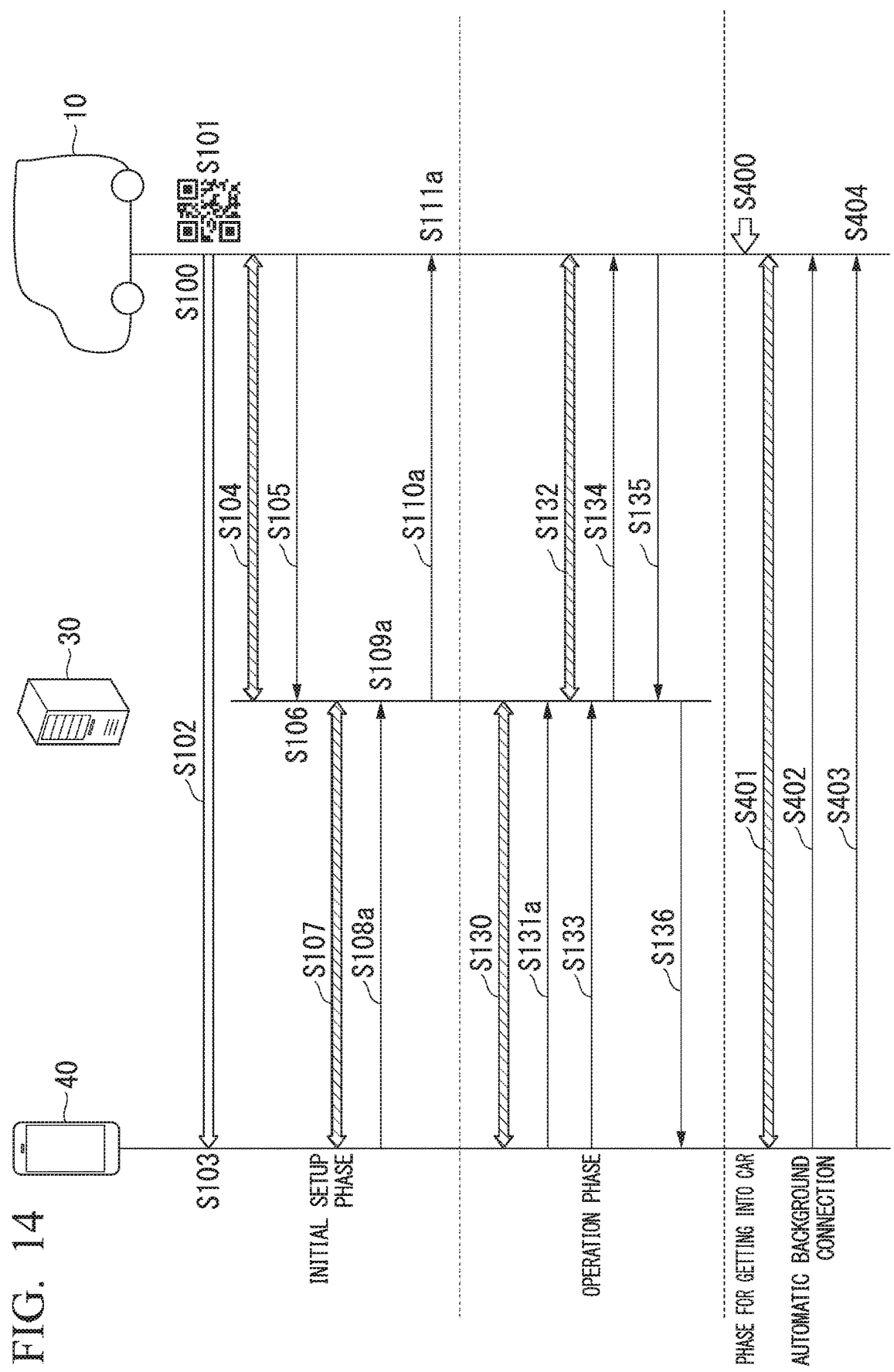
FIG. 14 is a sequence chart showing Example 9 of a vehicle security method according to an embodiment.

Next, Example 9 of the vehicle security method according to the present embodiment will be described with reference to FIG. 14. FIG. 14 is a sequence chart showing Example 9 of the vehicle security method according to the present embodiment. Example 9 of the vehicle security method is a modified example of the above-described examples 1 to 8 of the vehicle security method. Here, a modified example of the above-described Example 2 (FIG. 7) of the vehicle security method will be described as an example. In FIG. 14, parts corresponding to the respective steps of FIG. 7 are denoted by the same reference signs. Example 9 of the vehicle security method according to the present embodiment includes an initial setup phase and an operation phase as in the above-described examples 1 to 8 of the vehicle security method and further includes a phase for getting into the car when the user gets into the car 10.

In FIG. 14, the initial setup phase (steps S100 to S107 and S108a to S111a) and the operation phase (steps S130, S131a, and S132 to S136) are the same as those of the above-described Example 2 (FIG. 7) of the vehicle security method.
(Phase for Getting into Car)

(Step S400) The user gets into the car 10 and turns on an ignition switch (IG-ON). When the car 10 is an electric car, a process of turning on the ignition switch corresponds to a process of turning on a main power switch.

(Step S401) The vehicle communication unit 51 of the car 10 executes a connection of the near-field wireless communication to the terminal device 40 of the terminal ID of the vehicle storage unit 52. Here, if the user carries the terminal device 40 of the terminal ID, the terminal communication unit 41 of the terminal device 40 and the vehicle communication unit 51 of the car 10 establish the communication path 106 of a near-field wireless communication scheme. When the terminal communication unit 41 of the terminal device 40 and the vehicle communication unit 51 of the car 10 establish the communication path 106 of the near-field wireless communication scheme, the terminal communication unit 41 and the vehicle communication unit 51 perform near-field wireless communication via the communication path 106 in the phase for getting into the car thereafter.

On the other hand, if the user does not carry the terminal device 40 of the terminal ID, the vehicle communication unit 51 of the car 10 cannot establish the communication path 106 of the near-field wireless communication scheme with the terminal device 40 of the terminal ID. When the terminal communication unit 41 of the terminal device 40 and the vehicle communication unit 51 of the car 10 cannot establish the communication path 106 of the near-field wireless communication scheme, the phase for getting into the car is ended.

(Step S402) The terminal communication unit 41 of the terminal device 40 transmits a login message including the terminal ID and the password of the terminal device 40 to the car 10. The transmission of the login message of the terminal device 40 in the phase for getting into the car may be set so that the terminal device 40 automatically performs transmission (automatic background connection setup). Also, the password may be a password input to the terminal device 40 by the user in step S402 or may be a password that is saved after being input from the user in step S108a of the initial setup phase.

The vehicle communication unit 51 of the car 10 receives the login message from the terminal device 40. The vehicle determination unit 53 compares the password of the received login message with a password of the vehicle storage unit 52 associated with the terminal ID of the received login message.

When a comparison result indicates that the two passwords match, the verification of the password of the received login message succeeds. When the comparison result indicates that the two passwords do not match, the verification of the password of the received login message fails. When the verification of the password succeeds, a result of determining the login message is authentication success and the authentication of the terminal device 40 at the time of getting into the car succeeds. When the verification of the password succeeds, the subsequent processing is performed.

On the other hand, when the verification of the password fails, the operation phase is ended. When the verification of the password fails, a result of determining the login message is authentication failure and the authentication of the terminal device 40 at the time of getting into the car fails.

(Step S403) The terminal position information acquisition unit 44 of the terminal device 40 acquires terminal position information indicating a position of the terminal device 40. The terminal communication unit 41 transmits the terminal position information acquired by the terminal position information acquisition unit 44 to the car 10. The vehicle communication unit 51 of the car 10 receives the terminal position information from the terminal device 40.

(Step S404) The vehicle determination unit 53 of the car 10 determines whether or not the terminal device 40 registered in the car 10 (the terminal ID registered in step S111a) is valid. An example of this registered terminal determination method is shown below.

Example 1 of Registered Terminal Determination Method

The vehicle determination unit 53 executes a process of setting the terminal ID as invalid information in accordance with the absence (failure) of the authentication of the terminal device 40 of the terminal ID of the vehicle storage unit 52 after the ignition switch of the car 10 is turned on. Also, when the car 10 is an electric car, an on state of the ignition switch corresponds to an on state of the main power switch.

As an example of the present embodiment, the vehicle determination unit 53 executes a process of setting the terminal ID as invalid information when the authentication of the terminal device 40 using the login message of the terminal ID of the vehicle storage unit 52 continuously fails a prescribed number of times (N times) after the ignition switch of the car 10 is turned on. The process of setting the terminal ID as invalid information includes a process of deleting the terminal ID from the vehicle storage unit 52 and a process of deleting the terminal ID from the registration information of the server storage unit 32 by notifying the server device 30 of the invalidity of the terminal ID.

According to Example 1 of a registered terminal determination method, it is determined whether or not the terminal device 40 (the terminal ID) registered in the car 10 is valid and the terminal device 40 (the terminal ID) determined to be invalid is deleted from the registration information of the car 10. Thereby, the registration of the terminal device 40 (the terminal ID) in the car 10 can be invalidated. For example, when it is determined that the terminal device 40 (the terminal ID) registered in the car 10 is not valid if the owner or the user of the car 10 is changed due to resale or the like, the registration of the terminal device 40 (the terminal ID) in the car 10 can be invalidated. Also, a similar effect can be obtained when the user of the car 10 changes his own terminal device 40 due to a model change or the like.

Also, as a modified example of Example 1 of the registered terminal determination method, a process of setting the terminal ID as invalid information may be executed when the authentication of the terminal device 40 using the login message of the terminal ID of the vehicle storage unit 52 fails during a fixed period.

Example 2 of Registered Terminal Determination Method

The vehicle position information acquisition unit 56 of the car 10 acquires vehicle position information indicating the position of the car 10. The vehicle determination unit 53 causes the terminal ID to be stored as valid information in the vehicle storage unit 52 when a position indicated by the terminal position information received from the terminal device 40 of the terminal ID of the vehicle storage unit 52 and a position indicated by the vehicle position information acquired by the vehicle position information acquisition unit 56 are present within a prescribed range after the ignition switch of the car 10 is turned on. The prescribed range may be narrower than a communication range of the near-field wireless communication scheme. For example, the prescribed range may be within the car 10. For example, when a distance between the position indicated by the terminal position information and the position indicated by the vehicle position information is within 1 meter, the terminal ID is held as valid information in the vehicle storage unit 52.

According to Example 2 of the registered terminal determination method, when the position of the terminal device 40 of the terminal ID of the vehicle storage unit 52 and the position of the car 10 are present within a prescribed range (for example, within the car 10) after the ignition switch of the car 10 is turned on, the registration of the terminal device 40 (the terminal ID) in the car 10 can be validly kept.

Also, the vehicle determination unit 53 may execute a process of setting the terminal ID as invalid information when the position indicated by the terminal position information received from the terminal device 40 of the terminal ID of the vehicle storage unit 52 and the position indicated by the vehicle position information acquired by the vehicle position information acquisition unit 56 are not present within the prescribed range after the ignition switch of the car 10 is turned on (a modified example of Example 2 of the registered terminal determination method).

Also, Example 1 of the registered terminal determination method and Example 2 of the registered terminal determination method may be combined and applied.

For example, registration in the car 10 may be validly kept according to Example 2 of the registered terminal determination method with respect to the terminal device 40 (the terminal ID) determined to be invalid according to Example 1 of the registered terminal determination method.

In contrast, the registration in the car 10 is invalidated according to a modified example of Example 2 of the registered terminal determination method with respect to the terminal device 40 (the terminal ID) that is not determined to be invalid according to Example 1 of the registered terminal determination method. Thereby, this can be applied to a case in which the terminal device 40 of a resale source is present at a position where the near-field wireless communication with the car 10 can be performed by chance such as, for example, a case in which the resale source and a resale destination are acquaintances or neighbors. In this case, even if the authentication of the terminal device 40 using the login message from the terminal device 40 of the resale source succeeds, it is possible to invalidate the registration of the terminal device 40 (the terminal ID) of the resale source in the car 10 when the terminal device 40 of the resale source is not present within the car 10.

Example 10 of Vehicle Security Method

Next, Example 10 of the vehicle security method according to the present embodiment will be described with reference to FIG. 15. FIG. 15 is a sequence chart showing Example 10 of the vehicle security method according to the present embodiment. Example 10 of the vehicle security method is a modified example of the above-described examples 5 to 8 of the vehicle security method. Here, a modified example of the above-described Example 6 (FIG. 11) of the vehicle security method will be described as an example. In FIG. 15, parts corresponding to the respective steps of FIGS. 11 and 14 are denoted by the same reference signs. Example 10 of the vehicle security method according to the present embodiment includes an initial setup phase and an operation phase as in the above-described Example 5 to 8 of the vehicle security method, and further includes a phase for getting into a car when the user gets into the car 10 and a subsequent reporting phase.

In FIG. 15, the initial setup phase (steps S100 to S107 and S108a to S111a) is the same as that of the above-described Example 6 (FIG. 11) of the vehicle security method. Also, in the operation phase, steps S300, S301a, S302, and S303 are the same as those of the above-described Example 6 (FIG. 11) of the vehicle security method. Also, the transmission of the login message of the terminal device 40 (step S301a) may be set so that the terminal device 40 automatically performs transmission (automatic background connection setup).

After steps S300, S301a, S302, and S303, steps S400, S403 and S404 are executed. Steps S400, S403, and S404 are the same as those of the phase for getting into the car in the above-described Example 9 (FIG. 14) of the vehicle security method. In Example 10 of the vehicle security method, in step S404, the above-described Example 2 of the registered terminal determination method or a modified example of Example 2 of the registered terminal determination method is performed. Alternatively, both the above-described Example 2 of the registered terminal determination method and the modified example of Example 2 of the registered terminal determination method may be performed.

(Reporting Phase)

(Step S500) The terminal communication unit 41 of the terminal device 40 accesses a URL of the server device 30. The terminal communication unit 41 of the terminal device 40 and the server communication unit 31 of the server device 30 construct a VPN circuit. Thereafter, in the reporting phase, the terminal communication unit 41 and the server communication unit 31 communicate using the VPN circuit.

(Step S501) The terminal communication unit 41 of the terminal device 40 transmits a terminal ID of the terminal device 40, a VIN of the terminal storage unit 42, a password, and a result of executing an operation command to the server device 30. The password may be a password input to the terminal device 40 by the user in step S501 or may be a password which is saved after being input by the user in S108a of the initial setup phase.

The server communication unit 31 of the server device 30 receives the terminal ID, the VIN, the password, and the result of executing the operation command from the terminal device 40. The server determination unit 33 compares the received password with a password of the server storage unit 32 associated with the received terminal ID. When a comparison result indicates that the two passwords match, the verification of the received password succeeds. When the comparison result indicates that the two passwords do not match, the verification of the received password fails. When the verification of the password succeeds, the server storage unit 32 stores the received terminal ID, the received VIN, and the received result of executing the operation command in association. On the other hand, when the verification of the password fails, the received result of executing the operation command is discarded and the received result of executing the operation command is not stored in the server storage unit 32.

Although embodiments of the present invention have been described above with reference to the drawings, specific configurations are not limited to the embodiments, and design changes and the like may also be included without departing from the scope of the present invention.

Also, processes may be performed by recording a computer program for implementing functions of each device described above on a computer-readable recording medium and causing a computer system to read and execute the program recorded on the recording medium. Also, the "computer system" described here may include an operating system (OS) and hardware such as peripheral devices.

Also, the "computer-readable recording medium" refers to a storage device including a flexible disk, a magneto-optical disc, a read-only memory (ROM), a writable nonvolatile memory such as a flash memory, a portable medium such as a digital versatile disc (DVD), and a hard disk embedded in the computer system.

Furthermore, the "computer-readable recording medium" is assumed to include a medium that holds a program for a fixed period of time, such as a volatile memory (for example, a dynamic random access memory (DRAM)) inside a computer system serving as a server or a client when the program is transmitted via a network such as the Internet or a communication circuit such as a telephone circuit.

Also, the above-described program may be transmitted from a computer system storing the program in a storage device or the like via a transmission medium or transmitted to another computer system by transmission waves in a transmission medium. Here, the "transmission medium" for transmitting the program refers to a medium having a function of transmitting information, such as a network (a communication network) like the Internet or a communication circuit (a communication line) like a telephone circuit.

Also, the above-described program may be a program for implementing some of the above-described functions.

Further, the above-described program may be a program capable of implementing the above-described functions in combination with a program already recorded on the computer system, i.e., a so-called differential file (differential program).

INDUSTRIAL APPLICABILITY

According to the present invention, it is possible to improve security when a vehicle such as a car is accessed by means of communication from a terminal device such as a smartphone.

REFERENCE SIGNS LIST

1 Vehicle security system
10 Car
14 TCU
15 IVI device
16 Gateway device
17 In-vehicle network
18 ECU
30 Server device
31 Server communication unit
32 Server storage unit
33 Server determination unit
34 Server token issuance unit
40 Terminal device
41 Terminal communication unit
42 Terminal storage unit
43 Token acquisition unit
44 Terminal position information acquisition unit
51 Vehicle communication unit
52 Vehicle storage unit
53 Vehicle determination unit
54 Vehicle token issuance unit
55 Token provision unit
56 Vehicle position information acquisition unit
80 SIM
141 CPU
142 Storage unit
143 Interface unit
144 Communication module
145 Near-field communication module

The invention claimed is:

1. A vehicle security system, comprising:
a terminal device;
a server device; and
a vehicle,
wherein the terminal device includes:
   a token acquisition unit configured to acquire a token of the vehicle; and
   a terminal communication unit configured to transmit the token acquired by the token acquisition unit, terminal identification information of the terminal device, and vehicle identification information of the vehicle to the server device,
wherein the server device includes:
   a server communication unit configured to receive the token, the terminal identification information, and the vehicle identification information from the terminal device;
   a server determination unit configured to determine that authentication has succeeded when the token of the vehicle is the same as the token received from the terminal device by the server communication unit; and
   a server storage unit configured to store and associate the terminal identification information and the vehicle identification information received from an authenticated terminal device when the server determination unit determines that authentication has succeeded,
wherein the server communication unit transmits the token and the terminal identification information received from the authenticated terminal device to the vehicle whose vehicle identification information is received with the token from the authenticated terminal device when the token of the vehicle is the same as the transmitted token, and
wherein the vehicle includes:
   a vehicle communication unit configured to receive the token and the terminal identification information from the server device;
   a vehicle determination unit configured to determine that authentication has succeeded when the token of the vehicle is the same as the token received from the server device by the vehicle communication unit, the token received from the server device having been transmitted from the authenticated terminal device to the server device and determined by the server device to be the same as the token of the vehicle; and
   a vehicle storage unit configured to store the terminal identification information received from the server device in association with the token received from the server device when the vehicle determination unit determines that the authentication has succeeded.

2. The vehicle security system according to claim 1, wherein the vehicle includes a vehicle token issuance unit configured to issue the token of the vehicle and supply the token to the server device.

3. The vehicle security system according to claim 1, wherein the server device includes a server token issuance unit configured to issue the token of the vehicle and supply the token to the vehicle.

4. The vehicle security system according to claim 1, wherein the vehicle includes a token provision unit configured to provide the token of the vehicle within the vehicle.

5. The vehicle security system according to claim 1,
wherein the terminal communication unit transmits a password to the server device in addition to the token acquired by the token acquisition unit, the terminal identification information of the terminal device, and the vehicle identification information of the vehicle,
wherein the server communication unit receives the password in addition to the token, the terminal identification information, and the vehicle identification information from the terminal device,
wherein the server storage unit stores and associates the password, to the terminal identification information, and the vehicle identification information received from the authenticated terminal device,
wherein the server communication unit transmits the password to the vehicle whose vehicle identification information is received from the authenticated terminal device in addition to the token and the terminal identification information received from the authenticated terminal device,
wherein the vehicle communication unit receives the password in addition to the token and the terminal identification information from the server device, and
wherein the vehicle storage unit stores and associates the terminal identification information and the password received from the server device with the token received from the server device when the vehicle determination unit determines that authentication has succeeded.

6. The vehicle security system according to claim 1,
wherein the terminal communication unit transmits a message including the terminal identification information of the terminal device and the token acquired by the token acquisition unit to the server device,
wherein the server communication unit receives the message from the terminal device,
wherein the server determination unit determines that authentication has succeeded when the token of the vehicle is the same as the token included in the message received from the terminal device by the server communication unit,
wherein the server communication unit transmits vehicle control information received from the terminal device, which transmitted the message, to the vehicle whose vehicle identification information is stored in the server storage unit in association with the terminal identification information included in the message when a result of the server determination unit determines that the message authentication has succeeded, and
wherein the server communication unit does not transmit the vehicle control information received from the terminal device, which transmitted the message, to the vehicle when the server determination unit determines that the message authentication has failed.

7. The vehicle security system according to claim 5,
wherein the terminal communication unit transmits a message including the terminal identification information of the terminal device and the password to the server device,
wherein the server communication unit receives the message from the terminal device,
wherein the server determination unit determines that authentication has succeeded when a password stored in the server storage unit in association with the terminal identification information included in the message received from the terminal device by the server communication unit is the same as the password included in the message,
wherein the server communication unit transmits vehicle control information received from the terminal device, which transmitted the message, to the vehicle whose of the vehicle identification information is stored in the server storage unit in association with the terminal identification information included in the message, when the server determination unit determines that the password authentication has succeeded, and
wherein the server communication unit does not transmit the vehicle control information received from the terminal device, which transmitted the message, to the vehicle when the server determination unit determines that is the password authentication has failed.

8. The vehicle security system according to claim 1,
wherein the terminal communication unit transmits a message including the terminal identification information of the terminal device and the token acquired by the token acquisition unit to the vehicle,
wherein the vehicle communication unit receives the message from the terminal device,
wherein the vehicle determination unit determines that authentication has succeeded when the token of the vehicle is the same as the token of the message received from the terminal device by the vehicle communication unit,
wherein the vehicle executes a process based on vehicle control information received from the terminal device, which transmitted the message, when the vehicle determination unit determines that the message authentication has succeeded, and
wherein the vehicle does not execute the process based on the vehicle control information received from the terminal device, which transmitted the message, when the vehicle determination unit determines that the message authentication has failed.

9. The vehicle security system according to claim 5,
wherein the terminal communication unit transmits a message including the terminal identification information of the terminal device and the password to the vehicle,
wherein the vehicle communication unit receives the message from the terminal device,
wherein the vehicle determination unit determines that authentication has succeeded when the password stored in the vehicle storage unit in association with the terminal identification information included in the message received from the terminal device by the vehicle communication unit is the same as the password included in the message,
wherein the vehicle executes a process based on vehicle control information received from the terminal device, which transmitted the message, when the vehicle determination unit has determined that the message authentication has succeeded, and
wherein the vehicle does not execute the process based on the vehicle control information received from the terminal device, which transmitted the message, when the vehicle determination unit determines that the messages authentication has failed.

10. The vehicle security system according to claim 1,
wherein the vehicle communication unit establishes a communication with the terminal device of the terminal identification information stored in the vehicle storage unit after an ignition switch of the vehicle is turned on, and
wherein the vehicle determination unit executes a process of setting the terminal identification information as invalid information in accordance with an absence of authentication of the terminal device of the terminal identification information stored in the vehicle storage unit after the ignition switch of the vehicle is turned on.

11. The vehicle security system according to claim 1,
wherein the terminal device includes a terminal position information acquisition unit configured to acquire terminal position information indicating a position of the terminal device,
wherein the vehicle includes a vehicle position information acquisition unit configured to acquire vehicle position information indicating a position of the vehicle,
wherein the terminal communication unit transmits the terminal position information of the terminal device to the vehicle,
wherein the vehicle communication unit receives the terminal position information from the terminal device, and
wherein the vehicle determination unit causes the vehicle storage unit to store the terminal identification information as valid information when a first position indicated by the terminal position information received from the terminal device of the terminal identification information stored the vehicle storage unit and a second position indicated by the vehicle position information acquired by the vehicle position information acquisition unit are within a prescribed range after an ignition switch of the vehicle is turned on.

12. A vehicle security method, comprising:
acquiring, by a terminal device, a token of a vehicle;
transmitting, by the terminal device, the acquired token, terminal identification information of the terminal device, and vehicle identification information of the vehicle to a server device;
receiving, by the server device, the token, the terminal identification information, and the vehicle identification information from the terminal device;
determining, by the server device, that authentication has succeeded when the token of the vehicle is the same as the token received from the terminal device;
storing and associating in a server storage unit, by the server device, the terminal identification information and the vehicle identification information received from an authenticated terminal device when the authentication has succeeded;
transmitting, by the server device, the token and the terminal identification information received from the authenticated terminal device to the vehicle whose vehicle identification information is received with the token from the authenticated terminal device when the token of the vehicle is the same as the transmitted token;
receiving, by the vehicle, the token and the terminal identification information from the server device;
determining, by the vehicle, that authentication has succeeded when the token of the vehicle is the same as the token received from the server device, the token received from the server device having been transmitted from the authenticated terminal device and determined by the server device to be the same as the token of the vehicle; and
storing in a vehicle storage unit, by the vehicle, the terminal identification information received from the server device in association with the token received from the server device when the vehicle determines that authentication has succeeded.

* * * * *

UNITED STATES PATENT AND TRADEMARK OFFICE
CERTIFICATE OF CORRECTION

| | |
|---|---|
| PATENT NO. | : 11,366,885 B2 |
| APPLICATION NO. | : 16/629452 |
| DATED | : June 21, 2022 |
| INVENTOR(S) | : K. Takemori et al. |

It is certified that error appears in the above-identified patent and that said Letters Patent is hereby corrected as shown below:

On the Title Page

On page 2, Column 2, Line 26, item (56) under the heading "U.S. Pat. Documents," please change the inventor of U.S. Patent Publication No. 2018/0076958, "Nari" to -- Narimoto --.

In the Claims

At Column 27, Lines 46 and 47 (Claim 6) please change "when a result of the" to -- when the --.

At Column 28, Lines 3 and 4 (Claim 7) please change "whose of the vehicle" to -- whose vehicle --.

At Column 28, Line 13 (Claim 7) please change "that is the" to -- that the --.

Signed and Sealed this
Tenth Day of January, 2023

Katherine Kelly Vidal
*Director of the United States Patent and Trademark Office*